(12) United States Patent
Oishi et al.

(10) Patent No.: US 6,583,556 B2
(45) Date of Patent: Jun. 24, 2003

(54) FLAT-TYPE FLUORESCENT LAMP FOR ILLUMINATION UNIT AND LIQUID CRYSTAL DEVICE

(75) Inventors: Toshiya Oishi, Tokyo (JP); Fumihiko Fujishiro, Tokyo (JP); Tsutomu Kanatsu, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/994,807

(22) Filed: Nov. 28, 2001

(65) Prior Publication Data

US 2002/0063514 A1 May 30, 2002

(30) Foreign Application Priority Data

Nov. 29, 2000 (JP) ........................................ 2000-363746

(51) Int. Cl.⁷ .................................................. H01J 1/62
(52) U.S. Cl. ........................ 313/495; 313/422; 313/583
(58) Field of Search ................................ 313/422, 491, 313/583, 582

(56) References Cited

FOREIGN PATENT DOCUMENTS

| JP | 58-137236 | 8/1983 |
| JP | 09-172128 | 6/1997 |

*Primary Examiner*—Vip Patel
(74) *Attorney, Agent, or Firm*—Foley & Lardner

(57) ABSTRACT

A flat-type fluorescent lamp for LCD devices is provided, which makes it possible to narrow the picture-frame area and to widen the emission area and which facilitates their wiring, connection and assembly operations. The lamp comprises: (a) a container having a first plate, a second plate, and a frame member; the first and second plates being opposed to each other and fixed together with the frame member in such a way as to have a specific distance between the first and second plates; the first plate forming a flat emission surface; (b) a gaseous substance confined in the container; (c) a fluorescent material layer formed on an inner surface of the container; (d) electrodes formed on an inner surface of the second plate; and (e) a conductor member attached to the second plate in such a way as to extend along the inner surface of the second plate and an outer edge face thereof; a first end of the conductor member being contacted with a terminal part of the electrodes; a second end of the conductor member being located outside the second plate.

23 Claims, 15 Drawing Sheets

FLAT-TYPE FLUORESCENT LAMP FOR ILLUMINATION UNIT AND LIQUID CRYSTAL DEVICE

BACKGROUND OF THE INVENTION

1. Field of the Invention

The present invention relates to a flat-type fluorescent lamp with a flat emission surface. More particularly, the invention relates to a flat-type fluorescent lamp, an illumination unit using the lamp, and a Liquid-Crystal Display (LCD) device equipped with the lamp as its backlight, which make it possible to narrow the frame area of a LCD device and to widen its display area.

2. Description of the Related Art

Conventionally, illumination units are used to form the edge-type or direct-type backlights of LCD devices.

With the edge-light type backlight, a cylindrical fluorescent lamp is located apart from a LCD panel to extend along one edge of the panel. The lamp is not overlapped with the rear surface of the panel. A light guide plate, which is made of acrylic resin, is provided near the fluorescent lamp to guide the light from the lamp toward the rear of the panel. A diffuser sheet is provided near the light guide plate to diffuse the light emitted from the plate, thereby relaxing the unevenness of the light emitted from the plate. Thus, approximately even light is illuminated to the rear surface of the panel.

The edge-light type backlight has the following disadvantages:

First, the light from the fluorescent lamp is difficult to be guided to the rear surface of the panel efficiently and uniformly. This difficulty increases with the widening display area of LCD devices. Second, since the fluorescent lamp is located in the picture-frame area of LCD devices, the edge-light type backlight is unfavorable from the viewpoint of narrowing the picture-frame area.

With the direct-light type backlight, a lamp house is formed at the rear of the LCD panel, in which several cylindrical fluorescent lamps are arranged. If the lamps are located too close to the panel, the light from the lamps is locally illuminated to the rear surface of the panel, which means that the light has uneven brightness. To avoid this problem, the lamps need to be located to have a certain distance from the panel and at the same time, a diffuser plate is essentially provided between the lamps and the panel, thereby diffusing the light from the lamps. Thus, the direct-type backlight has a disadvantage that it is difficult to cope with the requirement of thinning LCD devices.

Flat-type fluorescent lamps are fluorescent lamps having a flat emission surface and have the basic structure that a pair of opposing plates is joined together with an intervening frame member, thereby forming a container. A gaseous substance, such as an inert gas and a mixture of an inert gas and gaseous mercury (Hg), is confined in the container.

Flat-type fluorescent lamps can be used as the direct-type backlight of LCD devices and therefore, they have an advantage that means for guiding the light from the lamp to the LCD panels is unnecessary. Since the emission surface can be opposed to the whole display area of the panel, there is another advantage that brightness unevenness is difficult to be observed even if the lamps are close to the panel. Accordingly, flat-type fluorescent lamps are expected as a technique that meets the requirement of widening and thinning of LCD devices.

Next, a prior-art LCD device equipped with a prior-art flat-type fluorescent lamp as its backlight is explained below with reference to FIGS. 1 and 2A and 2B. FIG. 1 is an exploded perspective view of the prior-art device, where the flat-type fluorescent lamp is partially cut away. FIG. 2A is a cross-sectional view of the assembled prior-art device along the line IIA—IIA in FIG. 1. FIG. 2B is a partial, enlarged cross-sectional view of the assembled prior-art device of FIG. 2.

As seen from FIGS. 1 and 2A and 2B, the prior-art flat-type fluorescent lamp 120 comprises a rectangular emission-side plate 101, a rectangular electrode-side plate 102, and a rectangular frame member 103 that intervenes between the plates 101 and 102 and that has a rectangular window at its center. The plates 101 and 102 are entirely overlapped with each other by way of the member 103 in such a way that the contour of the plate 101 accords with that of the plate 102. The rectangular outer edges (peripheral areas) of the plates 101 and 102 are placed outside the member 103. Electrodes 104 are formed on the inner surface of the plate 102 by a screen printing method or the like. The ends of part of the electrodes 104 are extended to the outside of the member 103 on the inner surface of the plate 102, forming four electrode terminals 107 (i.e., an anode terminal 107a, a cathode terminal 107b, a cathode terminal 107c, and an anode terminal 107d).

The prior-art LCD device shown in FIGS. 1 and 2A and 2B comprises a LCD panel 108, the prior-art flat-type fluorescent lamp 120 as the backlight, a rectangular front chassi 109, a rectangular center chassi 110, and a rectangular rear chassi 111. The panel 108 is located on the emission side of the lamp 120. The peripheral area of the panel 108 is sandwiched and held by the front and center chassis 109 and 110, as shown in FIGS. 2A and 2B.

The front chassi 109 has a frame-like shape with a rectangular window at its center. The peripheral area of the chassi 109 is bent at a right angle to form its sidewalls. The chassi 109 forms the front picture-frame area of the LCD device and the side faces thereof.

The center chassi 110 has a frame-like shape with a rectangular window at its center. The peripheral area of the chassi 110 is bent at a right angle to form its sidewalls. The chassi 110, which is located between the panel 108 and lamp 120, holds the lamp 120 with its sidewalls in such a way as to surround the lamp 120.

The rear chassi 111 has a rectangular bottom that forms the rear surface of the LCD device. The peripheral area of the chassi 111 is bent at a right angle at the whole edge of the bottom to form its sidewalls. The chassi 111 is located to cover the electrode-side plate 102 of the lamp 120.

These three chassis 109, 110 and 111 are combined together to enclose the panel 108 and the lamp 120. As shown in FIGS. 2A and 2B, a circuit board 112 is mounted on the opposite surface of the rear chassi 111 to the lamp 120 (i.e., the rear surface of the LCD device. The board 112 includes an inverter circuit and other necessary circuits formed thereon.

As shown in FIG. 2B, a fluorescent material layer 105 is formed on the inner surface of the emission-side plate 101 of the lamp 120. The plate 101 is formed by a transparent glass plate, on which the emission surface of the lamp 120 is formed. The emission-side plate 101 and the electrode-side plate 102 are coupled with each other by way of the frame member 103 with frit glass (i.e., glass with low-melting point) 114, forming a closed container with a shape of rectangular parallelepiped. A gaseous substance 106 (e.g., an inert gas) is confined into the container at a pressure of approximately 10 kPa to 100 kPa. A specific voltage is applied to the substance 106 by way of the electrodes 104.

As clearly shown in FIG. 1, an opening 115 is formed at the sidewall of the rear chassi 111. The opening 115 extends to the bottom of the chassi 111. Another opening 116 is formed at the sidewall of the center chassi 110. These openings 115 and 116 are overlapped with each other to form a cable window 117 for allowing cables to reach the inside of the assembly of the chassis 109, 110, and 111.

As clearly shown in FIGS. 1, 2A and 2B, each of the anode terminals 107a and 107d and the cathode terminals 107b and 107c is connected to one end of each cable 113 with a solder 118. The other end of each cable 113 is connected to the circuit board 112 by way of a connector. The circuits (e.g., the inverter circuit) formed on the board 112 control the electric power applied to the gaseous substance 106 by way of the cables 113.

The cables 113 are placed in such a way as to run through the inner space that is located outside the frame member 103 and that intervenes between the plates 101 and 102 and then, they are collected at the cable window 117. These cables 113 thus collected are taken out of the space through the window 117 to the rear side of the LCD device, where the outer ends of the cables 117 are connected to the board 112.

If an appropriate voltage is applied across the electrodes 104 of the flat-type fluorescent lamp 120, ultraviolet (UV) rays are excited and emitted due to discharge of the gaseous substance 106 in the container. The UV rays thus emitted will collide with the fluorescent material layer 105 in the container, emitting visible light. The visible light thus emitted will penetrate through the emission-side plate 1 of the lamp 120 and reach the LCD panel 108. As a result, images are shown on the display area of the LCD device.

In addition, typically, a dielectric layer (not shown) is formed on the inner surface of the electrode-side plate 1 to cover the electrodes 104. A reflection layer (not shown) is further formed on the dielectric layer. An optical sheet (not shown) like a light diffuser plate is usually placed on the emission surface of the lamp 120.

To prevent unfavorable deformation and damage due to thermal stress, the emission-side plate 101, the electrode-side plate 102, the frame member 103, and the frit glass 114 are made of appropriate materials whose thermal expansion coefficients are close to each other, respectively. The plate 102 needs not be transparent. However, it is usual that the plate 102 is made of the same glass material as the plate 101. The member 103 may be made of glass or ceramic. The front, center, and rear chassis 109, 110, and 111 are usually formed by aluminum (Al) plates.

Typical dimensions of the prior-art device are as follows:

The thickness of each of the plates 101 and 102 is approximately 2 mm. The thickness and width of the frame member 103 are approximately 4 mm and approximately 4 mm, respectively. The width of the peripheral area of each of the plates 101 and 102 that is outside the member 103 is approximately 5 mm. The size of the cable window 117 (i.e., the distance from the side face of the plate 102 to the inner side face of the front chassi 109) is approximately 2 mm.

The center chassi 110 has a function of sustaining the fluorescent lamp 120 and the LCD panel 108 (and the diffuser plate, if any) and positioning them. This is to match the position of the display area of the panel 108 with that of the emission area of the lamp 120. The chassi 110 has a rectangular protrusion 119 to position the panel 108 in such a way as to contact the corresponding edge of the panel 108.

The function of the chassi 110 may be realized with a frame-shaped sustaining member located inside the chassi 110. In this case, the sustaining member, which is made of synthetic resin such as polycarbonate, sustains the lamp 120 (and the diffuser plate, if any) within the window of the sustaining member and at the same time, sustains the panel 108 with a protrusion (like the protrusion 119) that penetrates through the window of the chassi 110.

The above-described prior-art flat-type fluorescent lamp 120 and the prior-art LCD device have the following problems:

First, the ends of the cables 113 are connected to the electrode terminals 107 and then, the cables 113 are placed to run through the inner space that is located outside the frame member 103 and that intervenes between the plates 101 and 102. Thereafter, the cables 113 are collected at the cable window 117 and taken out of the space through the window 117 to the rear side of the LCD device. The outer ends of the cables 117 are connected to the circuit board 112 on the rear side of the device. Thus, there is a problem that wiring, connection, and assembly operations of the device are troublesome and that the necessary length of the cables 113 is large.

Second, since the cable window 117 is necessarily formed between the electrode-side plate 102 and the front chassi 109, there is another problem that the structure is disadvantageous from the viewpoint of narrowing the picture-frame area.

Third, to place the outer ends of the electrode terminals 107 outside the frame member 103, the plate 102 needs to be formed in such a way that the peripheral area of the plate 102 is located outside the member 103. Thus, there is a further problem that the structure is disadvantageous from the viewpoint of narrowing the picture-frame area at this point also.

Furthermore, the Japanese Non-Examined Patent Publication No. 9-172128 published in 1997 discloses a mounting structure of an integrated circuit (IC). In this prior-art structure, a U-shaped dielectric case with a conductor is attached to the edge of a semiconductor (IC) chip, thereby decreasing the necessary wiring area around the chip. Thus, the necessary mounting area for the chip is reduced.

The Japanese Non-Examined Patent Publication No. 58-137236 published in 1983 discloses a hybrid IC structure. In this prior-art structure, a U-shaped electrode is attached to the edge of a wiring board, thereby converting the board a surface-mounting type. Thus, vertical useless space of the board is eliminated to thereby make the IC more compact.

However, the structures disclosed by these two Japanese Publications have no relationship with the flat-type fluorescent lamp. They disclose no application methods of the structures to the lamps of this type. As a result, the above-identified problems are difficult or unable to be solved.

SUMMARY OF THE INVENTION

The present invention was created to solve the above-identified problems of the prior-art lamp 20 and the prior-art LCD device shown in FIGS. 1 and 2A and 2B.

An object of the present invention is to provide a flat-type fluorescent lamp, an illumination unit, and a LCD device that make it possible to narrow the picture-frame area and to widen the emission area of light.

Another object of the present invention is to provide a flat-type fluorescent lamp, an illumination unit, and a LCD device that facilitate their wiring, connection and assembly operations.

Still another object of the present invention is to provide a flat-type fluorescent lamp, an illumination unit, and a LCD device that lower their fabrication cost.

The above objects together with others not specifically mentioned will become clear to those skilled in the art from the following description.

According to a first aspect of the invention, a flat-type fluorescent lamp is provided, which comprises:
(a) a container having a first plate, a second plate, and a frame member;
    the first and second plates being opposed to each other and fixed together with the frame member in such a way as to have a specific distance between the first and second plates;
    the first plate forming a flat emission surface;
(b) a gaseous substance confined in the container;
(c) a fluorescent material layer formed on an inner surface of the container;
(d) electrodes formed on an inner surface of the second plate; and
(e) a conductor member attached to the second plate in such a way as to extend along the inner surface of the second plate and an outer edge face thereof;
    a first end of the conductor member being contacted with a terminal part of the electrodes;
    a second end of the conductor member being located outside the second plate.

With the flat-type fluorescent lamp according to the first aspect of the invention, the conductor member is attached to the second plate in such a way as to extend along the inner surface of the second plate and an outer edge face thereof. One end of the conductor member is contacted with a terminal part of the electrodes while the other end of the conductor member is located outside the second plate.

Therefore, the cable window 117 of the prior-art LCD device is unnecessary and thus, the picture-frame area can be narrowed. Also, the problem that the wiring, connection, and assembly operations of the cables 28 are troublesome is solved and as a result, these operations are facilitated.

For example, even after the lamp according to the first aspect is built in the chassis of a LCD device, the connection operation of the cables is possible. This means that the connection part of the cables can be easily checked with naked eyes and easily repaired, which is an additional advantage.

Because of the improvement of these operations, the fabrication cost is expected to be lower. Since the cables can be connected to the end of the conductor member located on the outside of the container, the necessary length of the cables can be reduced. This contributes to cost down as well.

In a preferred embodiment of the lamp according to the first aspect of the invention, the conductor member is U-shaped in cross section. The second end of the conductor member is extended inwardly along an outer surface of the second plate. In this embodiment, the second end of the conductor member extended along the outer surface of the second plate serves as an external terminal and therefore, there is an additional advantage that space is saved around the external terminal and that easy and reliable connection of the external terminal to the cable or a circuit board placed outside the container is realized.

In another preferred embodiment of the lamp according to the first aspect of the invention, the first end of the conductor member is sandwiched by the second plate and the frame member. In this embodiment, since the first end of the conductor member is sandwiched by the second plate and the frame member, the conductor member can be held without protruding the edge of the second plate from the frame member. The terminal part of the electrodes and the conductor member can be contacted with each other between the second plate and the frame member or on the inside of the frame member. Thus, the edge of the second plate needs not be protruded to the outside of the frame member, which means that the picture-frame area of the lamp can be narrowed.

Moreover, since the first end of the conductor member is sandwiched by the second plate and the frame member, they can be securely fixed together with a connecting material such as frit glass. Thus, there is an additional advantage that the supportability of the conductor member is improved compared with the case where the conductor member is supported by connecting the conductor member to the terminal part of the electrodes with a conductive connecting material such as a solder and a conductive resin paste. For example, when the conductor member is supported by connecting the conductor member to the terminal part of the electrodes with a conductive connecting material, there is a possibility that other members or tools contact the conductor member on the outside, resulting in cracks at the connection part or detachment of the conductor member. This possibility is eliminated in this embodiment.

In still another preferred embodiment of the lamp according to the first aspect of the invention, a depression or recess is formed at a location of the second plate or the frame member near the conductor member. In this embodiment, when the depression or recess is formed at a location of the second plate, the first end of the conductor member is placed in the depression or recess and thus, the connection surface of the second plate will be flat. Therefore, there is an additional advantage that the dimensional accuracy between the first and second plates coupled with the frame member is prevented from degrading.

If the depression or recess is not formed at a location of the second plate, the conductor member will form a protrusion at the inner surface of the second plate. In this case, the dimensional accuracy between the first and second plates coupled with the frame member will degrade due to the protrusion. However, by forming the depression or recess at a location of the frame member, this problem is avoided.

In a further preferred embodiment of the lamp according to the first aspect of the invention, a circuit board having an electrode terminal is additionally provided on a side of an outer surface of the second plate. The electrode terminal of the circuit board is contacted with the second end of the conductor member. In this embodiment, since the electrode terminal of the circuit board is contacted with the second end of the conductor member, the electrode terminal of the circuit board is electrically connected to the second end of the conductor member without any cable. Thus, there is an additional advantage that the fabrication cost and the workload for connection and wiring operations are lowered by the cost of cable.

In a still further preferred embodiment of the lamp according to the first aspect of the invention, one of the electrode terminal and the conductor member has a part with spring function. The part with spring function is contactable with the other of the electrode terminal and the conductor member. In this embodiment, the electrode terminal and the conductor member are contacted with each other by way of the part with spring function. Thus, there is an additional advantage that electrical connection between the electrode terminal and the conductor member is carried out by a simple operation.

In a still further preferred embodiment of the lamp according to the first aspect of the invention, a chassi covering an outer surface of the second plate, and a circuit board having an electrode terminal and mounted on the chassi are additionally provided. The circuit board and the conductor member are fixed with a screw at the electrode terminal. In this embodiment, there is an additional advantage that the circuit board and the conductor member are securely combined together and that the wiring, connection, and assembly operations are facilitated.

In a still further preferred embodiment of the lamp according to the first aspect of the invention, a resin chassi covering an outer surface of the second plate, a circuit board having an electrode terminal and mounted on the chassi, and a circuit pattern placed on the chassi are additionally provided. The chassi includes first and second female screws located apart from each other. The circuit pattern extends from the first female screw to the second female screw. The electrode terminal of the chassi and the conductor member are overlapped and fixed by engaging a first male screw with the first female screw. The second end of the conductor member and the chassi are overlapped and fixed by engaging a second male screw with the second female screw.

In this embodiment, there is an additional advantage that even if the circuit board and the conductor member are built in with a considerable distance due to restriction about the size and/or mounting position of the board, the circuit board and the conductor member can be electrically connected each other. There is another additional advantage that the circuit board, the wiring pattern, and the conductor member are securely combined together and that the wiring, connection, and assembly operations are facilitated.

In a further preferred embodiment of the lamp according to the fourth aspect of the invention, an outer face of the frame member, an outer side face of the first plate, and an outer side face of the second plate form an approximately flat sidewall of the lamp. In this embodiment, there is an additional advantage that the picture-frame area is narrowed because the edges of the first and second plates do not protrude from the frame member.

Preferably, the sidewall of the lamp is approximately perpendicular to the emission surface. If the sidewall of the lamp is considerably oblique to the emission surface, the picture-frame area is expanded.

According to a second aspect of the invention, another flat-type fluorescent lamp is provided, which comprises:
(a) a containert having a first plate, a second plate, and a frame member;
    the first and second plates being opposed to each other and fixed together with the frame member in such a way as to have a specific distance between the first and second plates;
    the first plate forming a flat emission surface;
(b) a gaseous substance confined in the container;
(c) a fluorescent material layer formed on an inner surface of the container; and
(d) electrodes for applying a voltage to the gaseous substance;
    wherein an inner edge of the frame member on a side of the first plate is shifted outwardly from an inner edge of the frame member on a side of the second plate.

With the flat-type fluorescent lamp according to the second aspect of the invention, the inner edge of the frame member on the side of the first plate is shifted outwardly from the inner edge of the frame member on the side of the second plate and thus, the discharge space in the container expands toward the first plate (i.e., the emission surface) from the second plate. Therefore, the emission area is expanded and the picture-frame area around the emission area is narrowed.

In a preferred embodiment of the lamp according to the second aspect of the invention, the frame member has a trapezoidal cross section. In this embodiment, there is an additional advantage that the mechanical strength of the frame member (and therefore, the mechanical strength of the lamp itself) is increased.

In another preferred embodiment of the lamp according to the second aspect of the invention, an outer face of the frame member, an outer side face of the first plate, and an outer side face of the second plate form an approximately flat sidewall of the lamp. In this embodiment, there is an additional advantage that the picture-frame area is narrowed because the edges of the first and second plates do not protrude from the frame member.

Preferably, the sidewall of the lamp is approximately perpendicular to the emission surface. If the sidewall of the lamp is considerably oblique to the emission surface, the picture-frame area is expanded.

According to a third aspect of the invention, still another flat-type fluorescent lamp is provided, which comprises:
(a) a container having a first plate, a second plate, and a frame member;
    the first and second plates being opposed to each other and fixed together with the frame member in such a way as to have a specific distance between the first and second plates;
    the first plate forming a flat emission surface;
(b) a gaseous substance confined in the container;
(c) a fluorescent material layer formed on an inner surface of the container; and
(d) electrodes formed on an inner surface of the second plate;
    the electrodes having a terminal part;
    wherein the frame member has a recess for exposing the terminal part from the frame member outwardly;
    and wherein the recess is located in a peripheral area of the frame member.

With the flat-type fluorescent lamp according to the third aspect of the invention, even if the edge of the second plate does not protrude outward from the frame member, the terminal part of the electrodes can be exposed from the frame member by way of its recess. Thus, the picture-frame area of the lamp can be narrowed.

In a preferred embodiment of the lamp according to the third aspect of the invention, an outer face of the frame member, an outer side face of the first plate, and an outer side face of the second plate form an approximately flat sidewall of the lamp. In this embodiment, there is an additional advantage that the picture-frame area is narrowed because the edges of the first and second plates do not protrude from the frame member.

Preferably, the sidewall of the lamp is approximately perpendicular to the emission surface. If the sidewall of the lamp is considerably oblique to the emission surface, the picture-frame area is expanded.

According to a fourth aspect of the invention, a further flat-type fluorescent lamp is provided, which comprises:
(a) a container having a first plate, a second plate, and a frame member;
    the first and second plates being opposed to each other and fixed together with the frame member in such a way as to have a specific distance between the first and second plates;

the first plate forming a flat emission surface;
(b) a gaseous substance confined in the container;
(c) a fluorescent material layer formed on an inner surface of the container; and
(d) electrodes formed on an inner surface of the second plate;
  wherein an inner edge of the frame member on a side of the first plate is shifted outwardly from an inner edge of the frame member on a side of the second plate;
  and wherein an outer edge of the frame member on the side of the second plate is shifted inwardly from an outer edge of the frame member on the side of the first plate.

With the flat-type fluorescent lamp according to the fourth aspect of the invention, the inner edge of the frame member on the side of the first plate is shifted outwardly from the inner edge of the frame member on the side of the second plate. Thus, the discharge space in the container expands toward the first plate (i.e., the emission surface) from the second plate. Therefore, the emission area is expanded and the picture-frame area around the emission area is narrowed.

Moreover, the outer edge of the frame member on the side of the second plate is shifted inwardly from the outer edge of the frame member on the side of the first plate. Thus, a space is formed at an end of the inner surface of the second plate, which is outside the frame member. This means that a space applicable to exposing the terminal part of the electrodes is obtained along with the expanded emission area.

In a preferred embodiment of the lamp according to the fourth aspect of the invention, the frame member has a parallelogrammatic cross section. The inner face of the frame member and the second plate are at an acute angle. In this embodiment, there is an additional advantage that the frame member is easily processed mechanically.

In another preferred embodiment of the lamp according to the fourth aspect of the invention, an additional fluorescent material layer or a reflection layer is additionally formed on the inner face of the frame member. In this embodiment, because the additional fluorescent material layer emits light, the total amount of emission of light is increased in the vicinity of the frame member. Alternately, because the reflection layer suppresses the loss of UV rays due to collision to the frame member, the total amount of emission of light is increased in the vicinity of the frame member. Thus, there is an additional advantage that brightness insufficiency near the inner face of the frame member is eliminated in the discharge space in the container. This leads to increase in the effective emission area and decrease in picture-frame area.

Preferably, the fluorescent material of the fluorescent material layer in the container is formed to contact the frame member. This is to increase the amount of emission near the frame member.

According to a fifth aspect of the invention, an illumination unit is provided, which comprises one of the flat-type fluorescent lamps according to the first to fourth aspects.

With the illumination unit according to the fifth aspect of the invention, because one of the flat-type fluorescent lamps according to the first to fourth aspects is used, there are the advantages that (i) the picture-frame area is narrowed and the emission area is widened, (ii) the wiring, connection and assembly operations are facilitated, and (iii) the fabrication cost is lowered. Therefore, the illumination unit has improved uniformity of brightness and is light-weight and compact, which makes it possible to apply the unit versatile fields and/or purposes.

According to a sixth aspect of the invention, a LCD device is provided, which comprises one of the flat-type fluorescent lamps according to the first to fourth aspects and a LCD panel.

With the LCD device according to the sixth aspect of the invention, because one of the flat-type fluorescent lamps according to the first to fourth aspects is used, there are the advantages that (i) the picture-frame area is narrowed, (ii) the wiring, connection and assembly operations are facilitated, and (iii) the fabrication cost is lowered.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
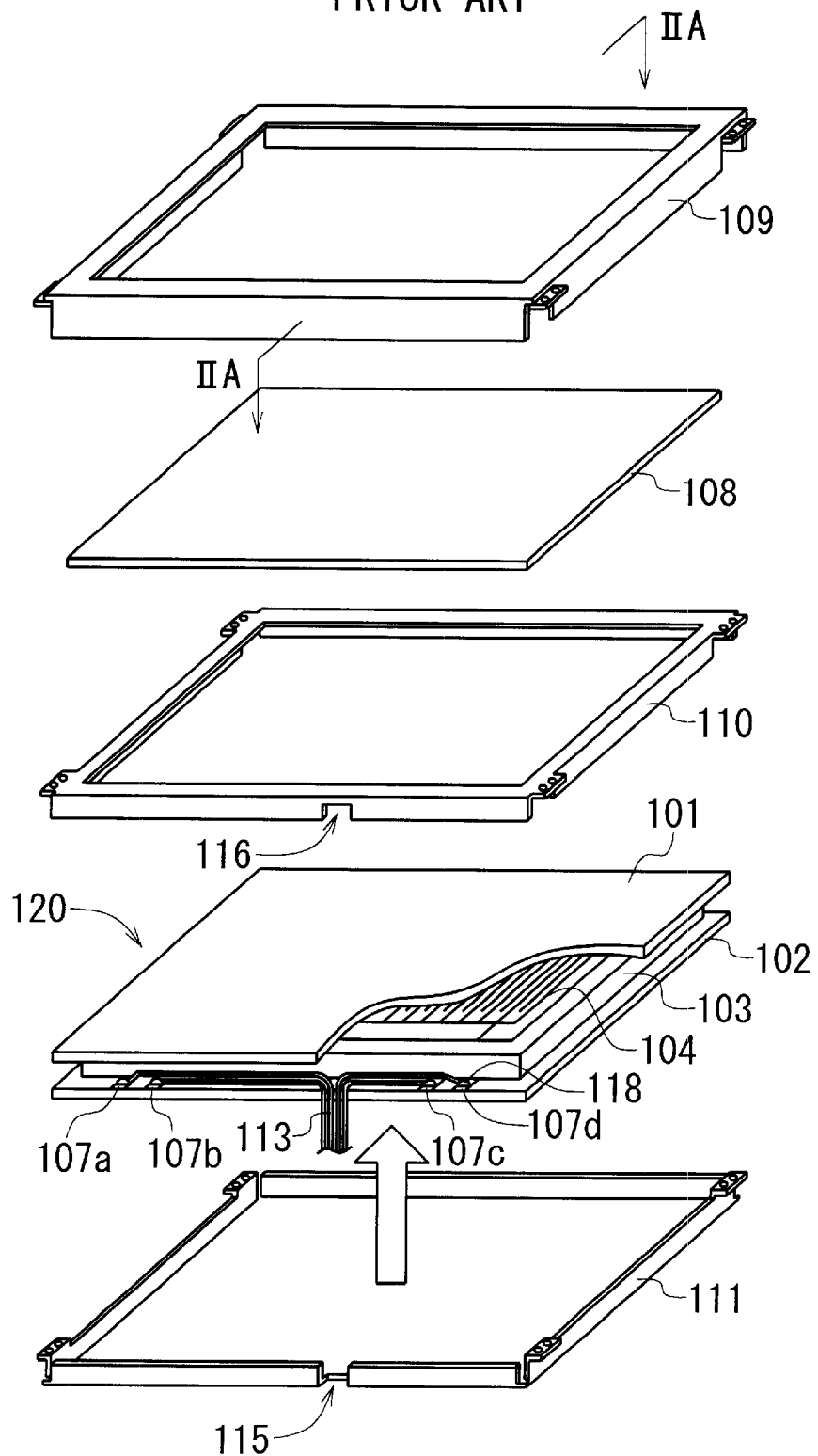
FIG. 1 is an exploded perspective view of a prior-art LCD device, where the flat-type fluorescent lamp is partially cut away.

Preferred embodiments of the present invention will be described in detail below while referring to the drawings attached.

First Embodiment

Figure 3A:
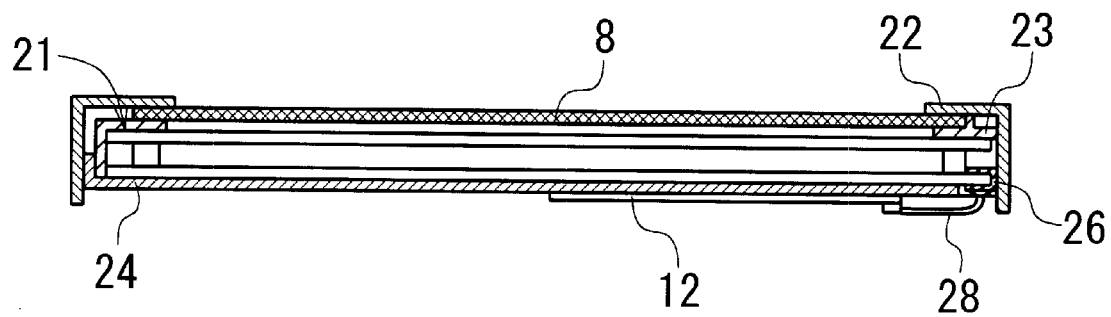
FIG. 3A is a cross-sectional view of a LCD device according to a first embodiment of the invention.
Figure 3B:
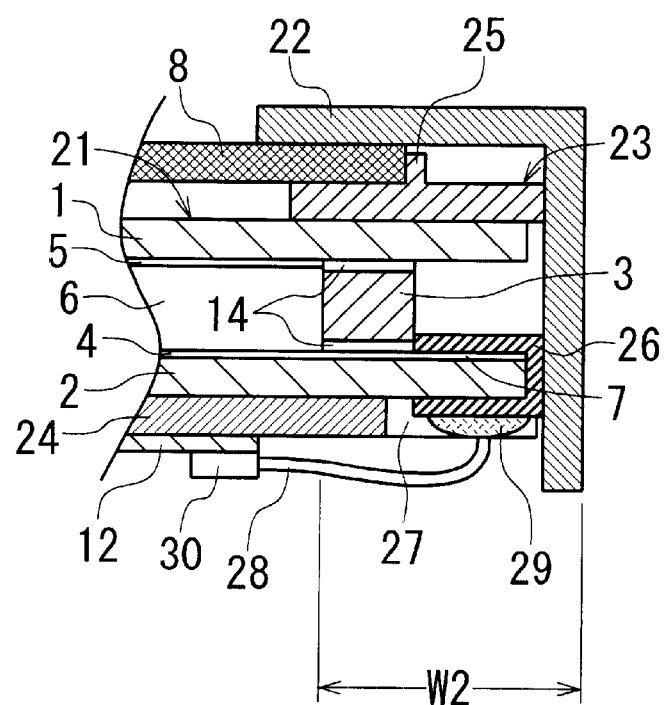
FIG. 3B is a partial, enlarged cross-sectional view of the LCD device of FIG. 3A.

FIGS. 3A and 3B show a LCD device according to a first embodiment of the invention, which comprises a LCD panel 8, a flat-type fluorescent lamp 21 as the backlight, a rectangular front chassi 22, a rectangular center chassi 23, and a rectangular rear chassi 24.

The flat-type fluorescent lamp 21 comprises a rectangular emission-side plate 1, a rectangular electrode-side plate 2, and a rectangular frame member 3 that intervenes between the plates 1 and 2. The plates 1 and 2 are entirely overlapped with each other by way of the member 3 in such a way that the contour of the plate 1 accords with that of the plate 2. The rectangular outer edges (peripheral areas) of the plates 1 and 2 are placed outside the member 3. Electrodes 4 are formed on the inner surface of the plate 2 by a screen printing method or the like. The ends of part of the electrodes 4 are extended to the outside of the member 3 on the inner surface of the plate 2, forming four electrode terminals 7 (i.e., two anode terminals and two cathode terminals).

The panel 8 is located on the emission side of the lamp 21. The peripheral area of the panel 8 is sandwiched by the front and center chassis 22 and 23, as shown in FIGS. 3A and 3B.

The front chassi 22 has a frame-like shape with a rectangular window at its center. The peripheral area of the chassi 22 is bent backward at a right angle to form its sidewalls. The chassi 22 forms the front picture-frame area of the LCD device and the side faces thereof.

The center chassi 23 has a frame-like shape with a rectangular window at its center. The chassi 23 is located between the panel 8 and lamp 21 and has a protrusion 25. The chassi 23 holds the lamp 21 in such a way as to surround the lamp 21. The protrusion 25 is used to position the panel 8 at the desired location.

The rear chassi 24 has a rectangular bottom that forms the rear surface of the LCD device. The chassi 24 is located to cover the electrode-side plate 2 of the lamp 21.

These three chassis 22, 23, and 24 are fixed together to enclose the panel 8 and the lamp 21. As shown in FIGS. 3A and 3B, a circuit board 12 is mounted on the opposite surface of the rear chassi 24 to the lamp 21 (i.e., the rear surface of the LCD device). The board 12 includes an inverter circuit and other necessary circuits.

As shown in FIG. 3B, a fluorescent material layer 5 is formed on the inner surface of the emission-side plate 1 of the lamp 21. The plate 1 is formed by a transparent glass plate, on which the emission surface of the lamp 21 is formed. The emission-side plate 1 and the electrode-side plate 2 are coupled together by way of the frame member 3 with frit glass (i.e., glass with low-melting point) 14, forming a closed container with a shape of rectangular parallelepiped. A gaseous substance 6 (e.g., an inert gas) is confined into the container at a pressure of approximately 10 kPa to 100 kPa.

If an appropriate voltage is applied across the electrodes 4 of the lamp 21, UV rays are excited and emitted due to discharge of the gaseous substance 6 in the container. The UV rays thus emitted will collide with the fluorescent material layer 5, emitting visible light in the container. The visible light thus emitted will penetrate through the emission-side plate 1 of the lamp 21 and reach the LCD panel 8. As a result, images are shown on the display area of the LCD device.

Figure 2A:
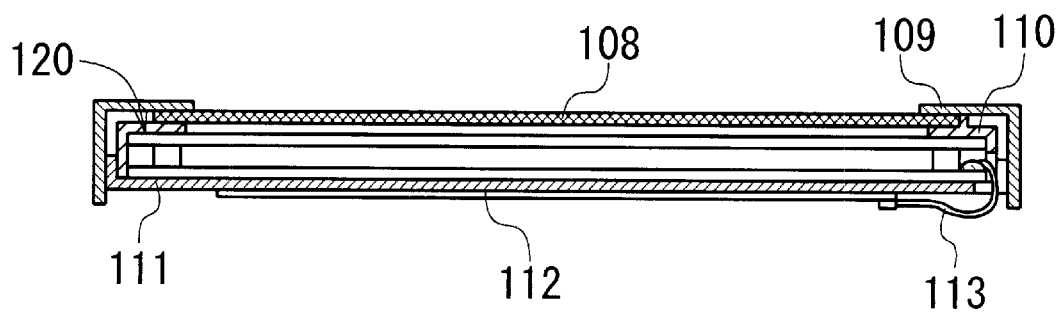
FIG. 2A is a cross-sectional view of the assembled prior-art LCD device along the line IIA—IIA in FIG. 1.
Figure 2B:
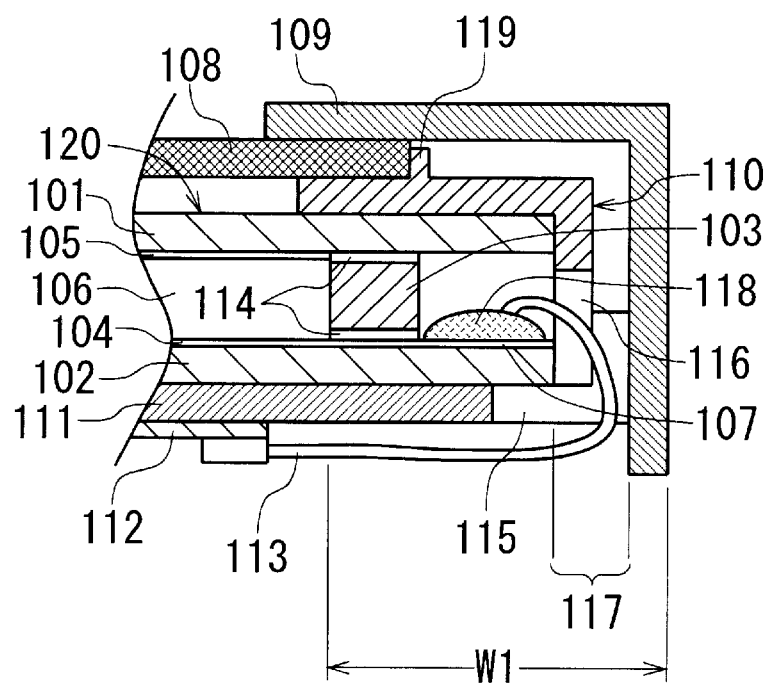
FIG. 2B is a partial, enlarged cross-sectional view of the assembled prior-art LCD device of FIG. 2.

As clearly shown in FIGS. 3A and 3B, four U-shaped conductor members or electrodes 26 are attached to the electrode-side plate 2 of the lamp 21, which is unlike the prior-art lamp 120 explained previously with reference to FIGS. 1, 2A and 2B. These electrodes 26 are the same in structure and function and therefore, one of the electrodes 26 is explained below for simplification.

The U-shaped electrode 26 is located at a position to overlap with a corresponding one of the electrode terminals 7. The electrode 26 is formed by two "arms" that extend respectively along the inner and outer surfaces of the plate 2, and a "middle part" that interconnects one of the arms to the other and that extends along the side or edge face of the plate 2. The inner arm of the electrode 26 on the inner surface of the plate 2 is contacted with and electrically connected to the corresponding terminal 7, The outer arm of the electrode 27 on the outer surface of the plate 2 is exposed from the rear chassi 24 by way of the window or opening 27 of the chassi 24 to the rear side of the LCD device. The exposed outer arm of the electrode 27 serves as its "external terminal". One end of a cable 28 is bonded to the "external terminal" with a solder 29. The other end of the cable 28 is connected to the circuit board 12 with a connector 30 mounted on the board 12.

Since the center and rear chassis 23 and 24 have no sidewalls at the side of the U-shaped electrode 26, the sidewall of the front chassi 22 contacts the electrode 26 at its middle part, as shown in FIG. 3B. Therefore, the chassi 22 needs to be made of a dielectric material such as synthetic resin. If the chassi 22 is made of a conductive material such as aluminum (Al), an appropriate insulating member is necessarily provided on the electrode 26 or chassi 22 in at least the contact area.

Next, the rear structure of the LCD device of the first embodiment is explained below with reference to FIG. 4.

Figure 4:
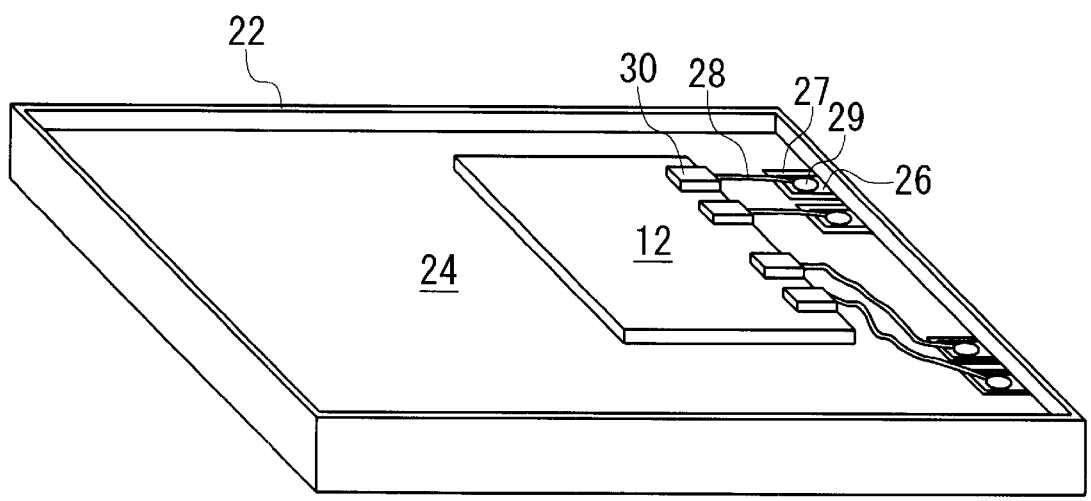
FIG. 4 is a perspective view of the LCD device according to the first embodiment of FIG. 2A, which shows the rear side of the device.

As shown in FIG. 4, the circuit board 12 having the connectors 30 is mounted on the rear chassi 24 for the U-shaped electrodes 26. Since the external terminal (i.e., the outer arm) of the electrode 26 is exposed to the rear of the LCD device through the corresponding cable window 27, the end of the cable 28 is bonded to the external terminal while the other end thereof is bonded to the connector 30. The cable 28 runs the gap between the external terminal and the connector 30 at a shortest distance without any detouring.

To prevent unfavorable deformation and damage due to thermal stress, the emission-side plate 1, the electrode-side plate 2, the frame member 3, and the frit glass 14 are made of appropriate materials whose thermal expansion coefficients are close to each other. Typically, the thermal expansion coefficient is 50 to $100 \times 10^{-7}/°$ C. The plate 2 needs not be transparent. However, it is usual that the plate 2 is made of the same glass material as the plate 1. The member 3 may be made of glass or ceramic.

The U-shaped electrode 26 is preferably made of a conductive material whose thermal expansion coefficient is close to these materials for the plates 1 and 2 and the member 3. For example, iron-nickel (Fe—Ni) alloy, iron-nickel-chromium (Fe—Ni—Cr) alloy, molybdenum (Mo), or tungsten (W) is preferred. Simply, the electrode 26 can be formed with a sheet (thickness: approximately 100 $\mu$m) made of one of these metals by pressing process.

The front, center, and rear chassis 22, 23, and 24 may be formed by aluminum (Al) plates.

With the LCD device according to the first embodiment of FIGS. 3A and 3B and 4, the U-shaped electrodes 26 (i.e., the conductor members) are attached to one edge of the electrode-side plate 2 of the flat-type fluorescent lamp 21 in such a way that the inner and outer arms of each electrode 26 extend along the inner and outer surfaces of the plate 2, respectively. One end of each electrode 26 is contacted with the terminal part of the electrodes 4 while the other end thereof is located outside the plate 2.

Therefore, the cable window 117 of the prior-art LCD device is unnecessary and thus, the picture-frame area can be narrowed. Also, the problem that the wiring, connection, and assembly operations of the cables 28 are troublesome is solved and as a result, these operations are facilitated.

For example, even after the lamp 21 is built in the chassis 22, 23, and 24, the connection operation of the cables 28 is possible. This means that the connection part of the cables 28 can be easily checked with naked eyes and easily repaired, which is an additional advantage.

Because of the improvement of these operations, the fabrication cost of the LCD device or lamp is expected to be lower. Since each cable 28 can be connected to the end (i.e., the external terminal) of the corresponding electrode 26 on the outside of the container, the necessary length of the cables 28 can be reduced. This contributes to cost down as well.

Typical dimensions of the parts of the LCD device of the first embodiment are as follows:

The thickness of the plates 1 and 2 is approximately 2 mm. The thickness and width of the frame member 3 are approximately 4 mm and approximately 4 mm, respectively. The width of the peripheral areas of the plates 1 and 2 that are outside the member 3 is approximately 5 mm. These dimensions are the same as those of the prior-art LCD device. In this case, the width W2 (i.e., the length between the inner side face of the member 3 to the outer side face of the front chassi 22) of the picture-frame area is decreased to approximately 10 mm from the width W1 (i.e., the length between the inner side face of the member 103 to the outer side face of the front chassi 109) of approximately 12 mm of the prior-art LCD device. This is because the gap of the cable window 117 of approximately 2 mm in the prior-art LCD device is unnecessary in the LCD device of the first embodiment.

Second Embodiment

Figure 5:
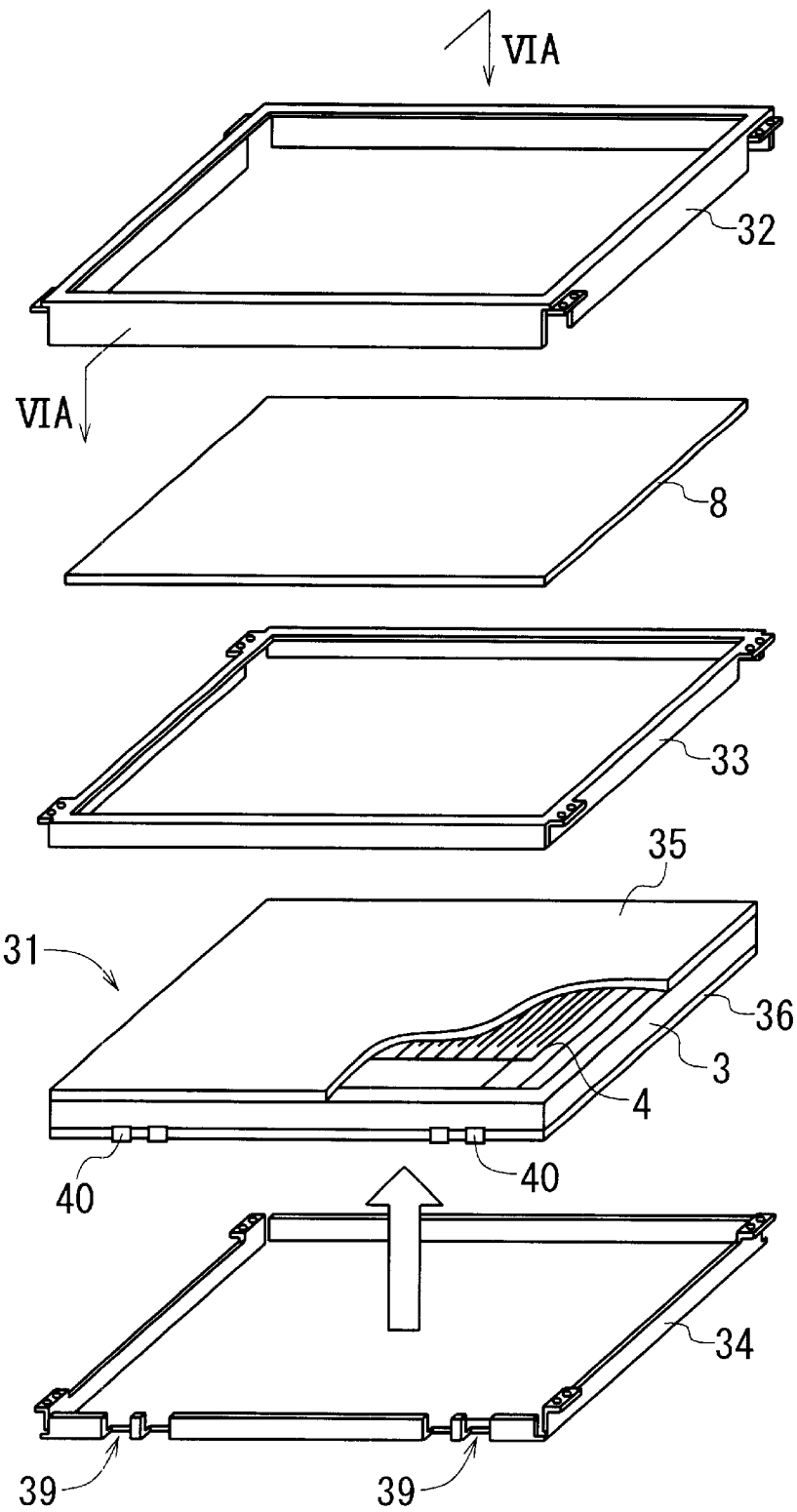
FIG. 5 is an exploded perspective view of a LCD device according to a second embodiment of the invention, where the flat-type fluorescent lamp is partially cut away.
Figure 6A:
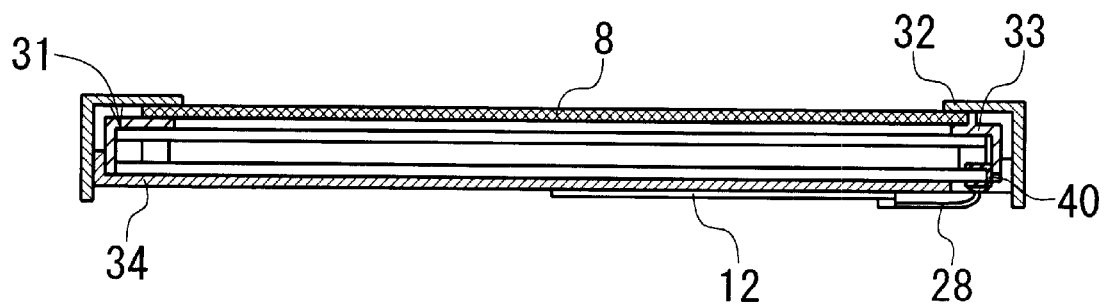
FIG. 6A is a cross-sectional view of the assembled LCD device along the line VIA—VIA in FIG. 5.
Figure 6B:
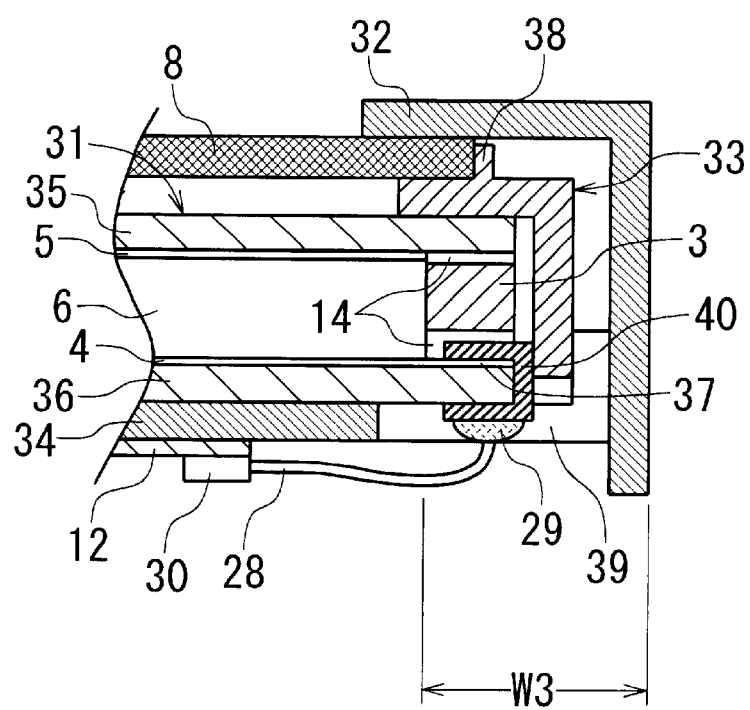
FIG. 6B is a partial, enlarged cross-sectional view of the assembled LCD device according to the second embodiment of FIG. 5.

FIGS. 5, 6A and 6B show a LCD device according to a second embodiment of the invention, which comprises the LCD panel 8, a flat-type fluorescent lamp 31 as the backlight, a rectangular front chassi 32, a rectangular center chassi 33, and a rectangular rear chassi 34.

The flat-type fluorescent lamp 31 comprises a rectangular emission-side plate 35, a rectangular electrode-side plate 36, and a rectangular frame member 3 that intervenes between the plates 35 and 36. The plates 35 and 36 are entirely overlapped with each other by way of the member 3 in such a way that the contour of the plate 35 accords with that of the plate 36. Unlike the first embodiment, the rectangular contours of the plates 35 and 36 accord with rectangular contour of the member 3. In other words, the outer edges of the plates 35 and 36 are not located outside the member 3. Thus, the outer side faces of the member 3 are approximately in the same planes as those of the corresponding outer side faces of the plates 35 and 36, which results in a flat side face of the lamp 31. Due to this structure, the peripheral areas of the plates 35 and 36 are not placed outside the member 3, resulting in narrowing the picture-frame area.

Electrodes 4 are formed on the inner surface of the plate 36 by a screen printing method or the like. The ends of part of the electrodes 4 are extended to the joining area of the inner surface of the plate 36 with the member 3, forming four electrode terminals 37 (i.e., two anode terminals and two cathode terminals).

The panel 8 is located on the emission side of the lamp 31. The peripheral area of the panel 8 is sandwiched by the front and center chassis 32 and 33, as shown in FIGS. 6A and 6B.

The front chassi 32 has a frame-like shape with a rectangular window at its center. The peripheral area of the chassi 32 is bent backward at a right angle to form its sidewalls. The chassi 32 forms the front picture-frame area of the LCD device and the side faces thereof.

The center chassi 33 has a frame-like shape with a rectangular window at its center. The peripheral area of the chassi 33 is bent backward at a right angle to form its sidewalls. The chassi 33, which is located between the panel 8 and lamp 31 and has a protrusion 38 extending toward the front chassi 32, holds the lamp 31 with its sidewalls in such a way as to surround the lamp 31. The protrusion 38 is used to position the panel 8 at the desired location.

The rear chassi 34 has a rectangular bottom that forms the rear surface of the LCD device. The peripheral area of the chassi 34 is bent backward at a right angle at the whole edge of the bottom part to form its sidewalls. The chassi 34, which is located to cover the electrode-side plate 36 of the lamp 31, has four windows or openings 39 at positions corresponding to the electrode terminals 37.

These three chassis 32, 33, and 34 are fixed together to enclose the panel 8 and the lamp 31. As shown in FIGS. 6A and 6B, a circuit board 12 is mounted on the opposite surface of the rear chassi 34 to the lamp 31 (i.e., the rear surface of the LCD device). The board 12 includes an inverter circuit and other necessary circuits.

As shown in FIG. 6B, a fluorescent material layer 5 is formed on the inner surface of the emission-side plate 35 of the lamp 31. The plate 35 is formed by a transparent glass plate, on which the emission surface of the lamp 31 is formed. The emission-side plate 35 and the electrode-side plate 36 are combined together by way of the frame member 3 with frit glass 14, forming a closed container with a shape of rectangular parallelepiped. A gaseous substance 6 (e.g., an inert gas) is confined into the container at a pressure of approximately 10 kPa to 100 kPa.

If an appropriate voltage is applied across the electrodes 4 of the lamp 31, UV rays are excited and emitted to collide with the fluorescent material layer 5, emitting visible light in the container. The visible light thus emitted will penetrate through the emission-side plate 1 of the lamp 31 and reach the LCD panel 8. As a result, images are shown on the display area of the LCD device.

As clearly shown in FIGS. 5, 6A and 6B, four U-shaped conductor members or electrodes 40 are attached to one edge of the electrode-side plate 36 of the lamp 31, which is unlike the prior-art lamp 120 explained previously with reference to FIGS. 1, 2A and 2B. These electrodes 40 are the same in structure and function and therefore, one of the electrodes 40 is explained below for simplification.

The U-shaped electrode 40 is located at a position to overlap with a corresponding one of the electrode terminals 37. Like the U-shaped electrode 26 in the first embodiment, the electrode 40 is formed by two "arms" that extend respectively along the inner and outer surfaces of the plate 36, and a "middle part" that interconnects one of the arms to the other and that extends along the side face of the plate 36. The inner arm of the electrode 40 on the inner surface of the plate 36 is contacted with and electrically connected to the corresponding terminal 37 with a solder or conductive paste (not shown). The inner arm of the electrode 40 is sandwiched by the plate 36 and frame member 3 and fixed with the frit glass. The outer arm of the electrode 40 on the outer surface of the plate 36 is exposed to the rear side of the LCD device by way of the window or opening 37 of the rear chassi 34. The exposed outer arm of the electrode 37 serves as its "external terminal". One end of a cable 28 is bonded to the "external terminal" with a solder 29. The other end of the cable 28 is connected to the circuit board 12 with a connector 30 mounted on the board 12.

Next, the assembly process of the LCD device of the second embodiment of FIGS. 5, 6A and 6B is explained below.

First, the U-shaped electrode 40 is attached to the corresponding position of the electrode-aide plate 36 to the electrode terminal 37 in such a way that the inner and outer arms of the electrode 40 extend along the inner and outer surfaces of the plate 36, respectively. The electrode 40 thus attached is fixed to the terminal 37 with a solder or conductive paste (not shown). Thereafter, the plates 35 and 36 are coupled with the frame member 3 by way of the frit glass 14, forming the closed container.

In this state, the outer arm of the electrode 40, which runs along the outer surface of the plate 36, is exposed to the rear of the LCD device by way of the opening 39 of the rear chassi 34. Then, the end of the cable 28 is fixed to the outer arm of the electrode 40 serving as the external terminal with the solder 29. The other end of the cable 28 is connected to the circuit board 12 by way of the connector 30.

To prevent unfavorable deformation and damage due to thermal stress, the emission-side plate 35, the electrode-side plate 36, the frame member 3, and the frit glass 14 are made of appropriate materials whose thermal expansion coefficients are close to each other. Typically, the thermal expansion coefficient is 50 to $100 \times 10^{-7}/°$ C. The plate 36 needs not be transparent. However, it is usual that the plate 36 is made of the same glass material as the plate 35. The member 3 may be made of glass or ceramic. These are the same as the first embodiment.

The U-shaped electrode 40 is preferably made of a conductive material whose thermal expansion coefficient is close to these materials for the plates 35 and 36 and the member 3. For example, iron-nickel (Fe—Ni) alloy, iron-nickel-chromium (Fe—Ni—Cr) alloy, molybdenum (Mo), or tungsten (W) is preferred. Simply, the electrode 40 can be formed with a sheet (thickness: approximately 100 $\mu$m) made of one of these metals by pressing process.

The front and rear chassis 32 and 34 may be formed by aluminum (Al) plates or the like. The center chassi 33 is formed by a dielectric, synthetic resin to prevent electrical short-circuit of the chassi 33 with the electrode 40.

With the LCD device according to the second embodiment of FIGS. 5 and 6A and 6B, the contour of the emission-side plate 35 of the lamp 31 accords with that of the electrode-side plate 36 thereof. Moreover, the rectangular contours of the plates 35 and 36 accord with rectangular contour of the member 3. In other words, the peripheral areas of the plates 35 and 36 are not placed outside the member 3. Therefore, the picture-frame area is narrowed compared with the prior-art LCD device and the inventive LCD device according to the first embodiment. This leads to enlarging the display area of the LCD device.

On the other hand, the U-shaped electrode 40 (i.e., the conductor member) is attached to the electrode-side plate 36 of the flat-type fluorescent lamp 31 in such a way that the inner and outer arms of the electrodes 40 extend along the inner and outer surfaces of the plate 36, respectively. The inner end of the electrode 26 is contacted with the terminal part of the electrodes 4 while the outer end thereof is located outside the plate 36. Thus, the electrodes 4 can be electrically connected to the circuit board 12 even if the picture-frame area is narrowed in the above-described manner.

Also, the problem that the wiring, connection, and assembly operations of the cables 28 are troublesome is solved and as a result, these operations are facilitated.

Typical dimensions of the parts of the LCD of the second embodiment are as follows:

In the LCD device with the lamp 21 according to the first embodiment of FIGS. 3A, 3B and 4, the protrusion width of the plates 1 and 2 from the outer side face of the frame member 3 is approximately 5 mm. Thus, the width W2 of the picture-frame area (i.e., the distance from the inner edge of the frame member 3 to the outer side surface of the LCD device) is approximately 10 mm. On the other hand, in the LCD device with the lamp 31 according to the second embodiment of FIGS. 5, 6A and 6B, the width W3 of the picture-frame area is approximately 7 mm, because the edges of the plates 35 and 36 do not protrude from the member 3.

Moreover, if the structure of the LCD device is changed in such a way that the sidewalls of the center and rear chassis 33 and 34 are cancelled and the sidewall of the front chassi 32 contacts the U-shaped electrode 40, the width W3 of the picture-frame area can be decreased to approximately 5 mm.

The LCD device of the second embodiment has an additional advantage that the securing strength of the U-shaped electrode 40 is enhanced. This is because the inner arm of the U-shaped electrode 40 is sandwiched by the electrode-side plate 36 and the frame member 3 and fixed with the frit glass 14 provided for joining the plate 36 to the member 3.

Third Embodiment

Figure 7A:
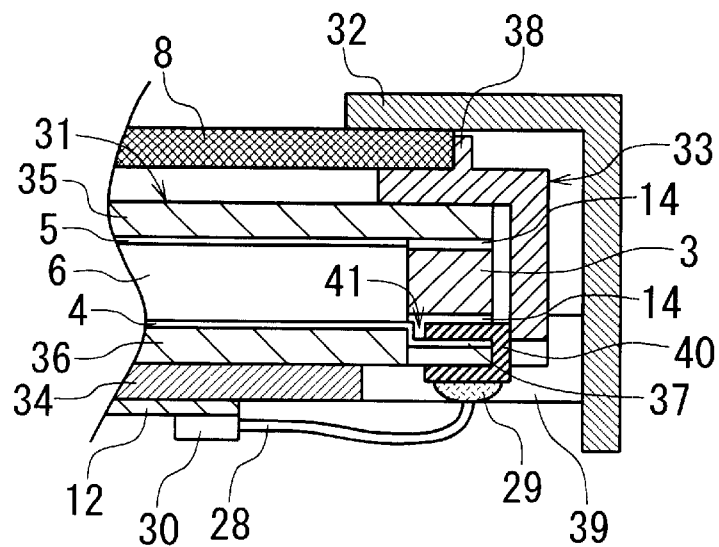
FIG. 7A is a partial, enlarged cross-sectional view of a LCD device according to a third embodiment of the invention.
Figure 7B:
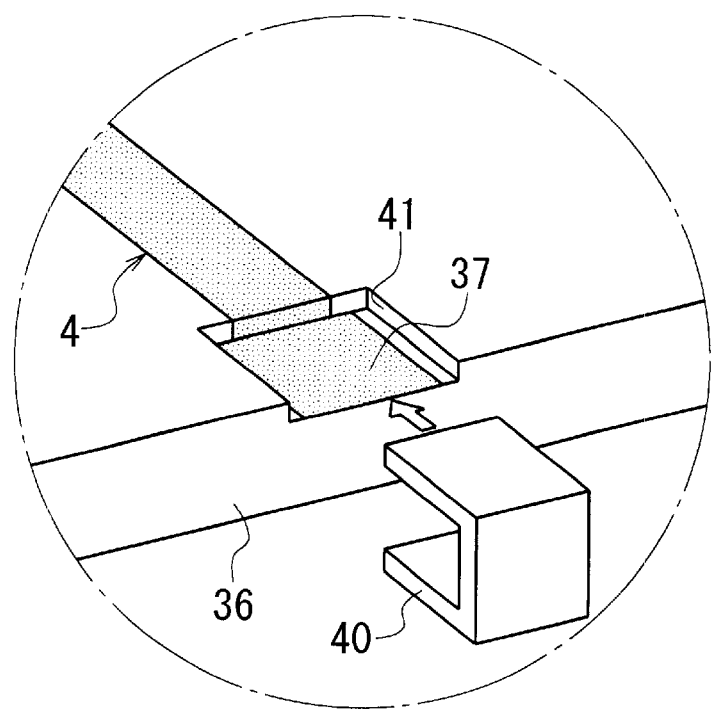
FIG. 7B is a partial, enlarged perspective view of the LCD device according to the third embodiment of FIG. 7A.

FIGS. 7A and 7B show a LCD device according to a third embodiment of the invention, which has substantially the same configuration as the LCD device of the second embodiment of FIGS. 5, 6A and 6B, except that the electrode-side plate 36 has a rectangular recess 41 at the position where the inner arm of the U-shaped electrode 40 is placed, and that the inner arm is received in the recess 41. Therefore, the detailed explanation is omitted here for simplification by attaching the same reference symbols as those used in the second embodiment in FIGS. 7A and 7B.

Specifically, as shown in FIGS. 7A and 7B, the rectangular recess 41 is formed on the inner surface of the plate 36 at the position where the inner arm of the U-shaped electrode 40 is attached. The recess 41 extends inwardly from the side edge of the plate 36 at a specific length. The electrode terminal 37 is located on the bottom of the recess 41. The inner end of the U-shaped electrode 40 is entirely buried in the recess 41 to be contacted with the terminal 37. The frame member 3 is fixed to the inner surface of the plate 36 with the frit glass 14 in the area that surrounds the recess 41.

In the assembly operation, first, as shown in FIG. 7B, the U-shaped electrode 40 is attached to the specific edge of plate 36 in such a way that the inner arm of the electrode 40 is entirely placed in the recess 41. Next, the inner arm of the electrode 40 is joined to the electrode terminal 37 with a solder or conductive paste (not shown). Thereafter, as shown in FIG. 7A, the plates 35 and 36 and the frame member 3 are coupled together with the frit glass 14.

With the above-described LCD device of the second embodiment, the electrode 40 attached to the plate 36 forms a protrusion on the inner surface of the plate 36. Therefore, when the frame member 3 is joined to the inner surface of the plate 36, the distance between the plates 35 and 36 is larger in the vicinity of electrode 40 than the remaining area due to the protrusion by the electrode 40. Thus, there is a possibility that the dimensional accuracy of the lamp 21 degrades.

On the contrary, with the LCD device of the third embodiment, when the electrode 40 is attached to the plate 36, the inner arm of the electrode 40 is entirely buried in the recess 41 and thus, the inner surface of the plate 36 is entirely flat. Therefore, when the frame member 3 is joined to the inner surface of the plate 36, the distance between the plates 35 and 36 is uniform over the whole areas of the plates 35 and 36. Thus, there is no possibility that the dimensional accuracy of the lamp 31 degrades.

Fourth Embodiment

Figure 8A:
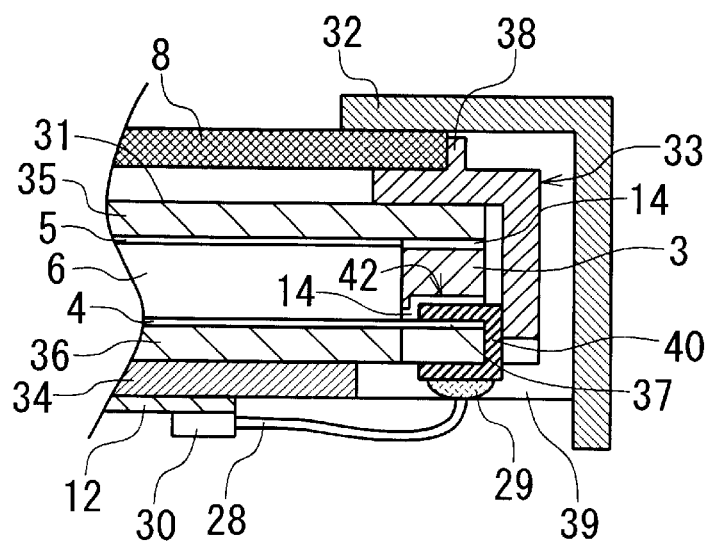
FIG. 8A is a partial, enlarged cross-sectional view of a LCD device according to a fourth embodiment of the invention.
Figure 8B:
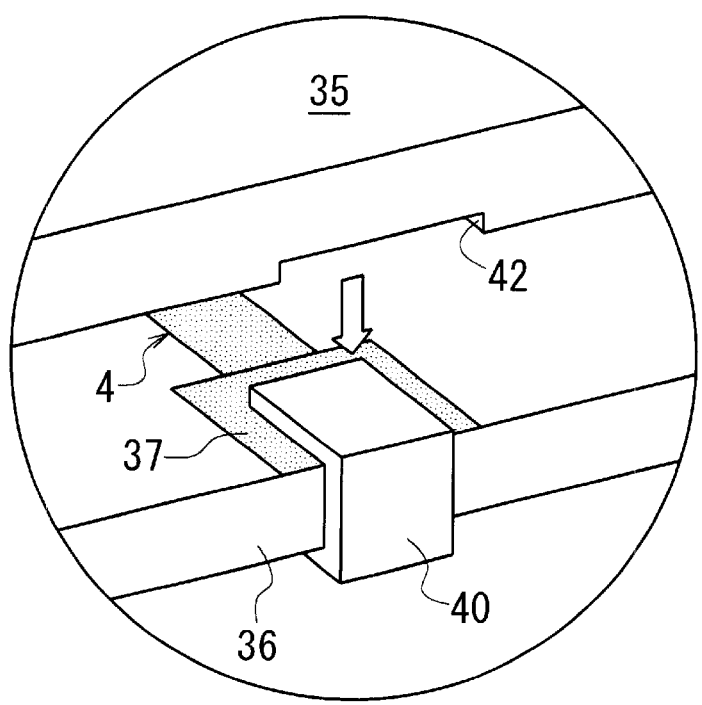
FIG. 8B is a partial, enlarged perspective view of the LCD device according to the fourth embodiment of FIG. 8A.

FIGS. 8A and 8B show a LCD device according to a fourth embodiment of the invention, which has substantially the same configuration as the LCD device of the second embodiment of FIGS. 5, 6A and 6B, except that the frame member 3 has a rectangular recess 42 at the opposing position to the inner arm of the U-shaped electrode 40 attached to the plate 36. Therefore, the detailed explanation is omitted here for simplification by attaching the same reference symbols as those used in the second embodiment in FIGS. 8A and 8B.

Specifically, as shown in FIGS. 8A and 8B, the rectangular recess 42 is formed on the electrode-side face of the member 3 to be opposite to the inner arm of the U-shaped electrode 40. The recess 42 extends inwardly from the outer side edge of the member 3 at a specific length. If the inner arm is longer than the width of the member 3, it is preferred that the recess 42 is formed to extend from the outer side edge of the member 3 to its inner side edge. The inner end of the U-shaped electrode 40 is received in the recess 42 and is contacted with the terminal 37. The frame member 3 is fixed to the inner surface of the plate 36 with the frit glass 14 in the area that surrounds the recess 42 or the inner arm.

In the assembly operation, first, as shown in FIG. 8B, the U-shaped electrode 40 is attached to the specific edge of plate 36 in such a way that the inner arm of the electrode 40 contacts the electrode terminal 37. Next, the inner arm of the electrode 40 is joined to the terminal 37 with a solder or conductive paste (not shown). Thereafter, as shown in FIG. 8A, the plates 35 and 36 and the frame member 3 are coupled together with the frit glass 14 in such a way that the inner arm of the electrode 40 is buried in the recess 42.

With the above-described LCD device of the second embodiment, as explained above in the third embodiment, there is a possibility that the dimensional accuracy of the lamp 31 degrades due to the protruding inner arm of the U-shaped electrode 40.

On the contrary, with the LCD device of the fourth embodiment, when the plates 35 and 36 and the frame member 3 are coupled together with the frit glass 14, the inner arm of the electrode 40 is entirely buried in the opposing recess 42. Therefore, the distance between the plates 35 and 36 is uniform, which means that there is no possibility that the dimensional accuracy of the lamp 31 degrades.

Fifth Embodiment

Figure 9A:
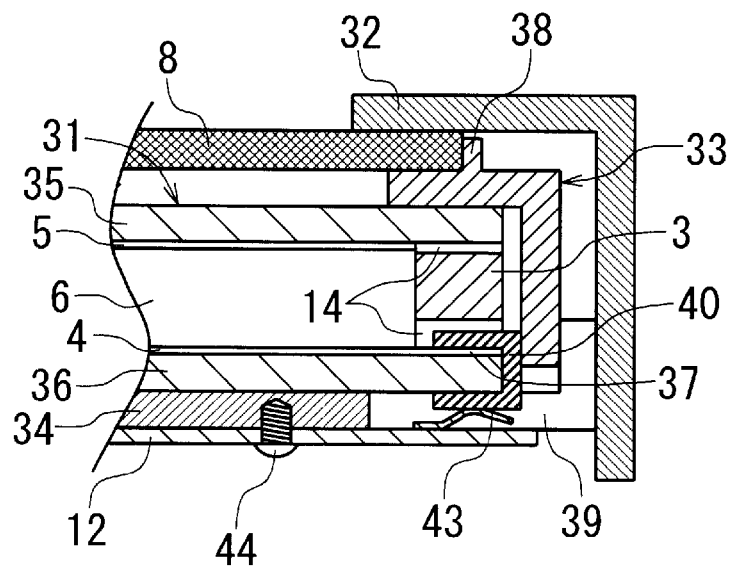
FIG. 9A is a partial, enlarged cross-sectional view of a LCD device according to a fifth embodiment of the invention.

FIG. 9A shows a LCD device according to a fifth embodiment of the invention, which has substantially the same configuration as the LCD device of the second embodiment of FIGS. 5, 6A and 6B, except that the circuit board 12 has an electrode terminal 43 and that the outer arm of the U-shaped electrode 40 is mechanically contacted with the opposing terminal 43 for electrical interconnection without any cable. Therefore, the detailed explanation is omitted here for simplification by attaching the same reference symbols as those used in the second embodiment in FIG. 9A.

Specifically, as shown in FIG. 9A, the electrode terminal 43, which is made of a conductive metal piece, is formed on the back surface of the circuit board 12. One end of the terminal 43 is fixed to the board 12 and the other end thereof is free and as a result, the terminal 43 has elasticity. When the board 12 is mounted on the rear chassi 34 and fixed thereto with a screw 44 in such a way that the terminal 43 is opposed to the outer arm of the U-shaped electrode 40, the free end of the terminal 43 is contacted with the outer arm under pressure. Thus, secure electrical interconnection between the electrode 40 and the terminal 43 is realized.

With the LCD device of the fifth embodiment, as described above, the U-shaped electrode 40 is electrically connected to the circuit board 12 without any cable. Thus, there is an additional advantage that the fabrication cost of the LCD device can be lowered by the cost of cable and the workload for wiring cables is eliminated.

Moreover, there is another additional advantage that the electrode terminal 43 on the board 12 is automatically connected securely to the U-shaped electrode 40 with the elasticity of the terminal 43 through the operation of mounting the board 12 onto the rear chassi 34. This means that secure electrical interconnection can be completed through the simple mounting operation of board 12 without increasing the number of assembly operations.

Figure 9B:
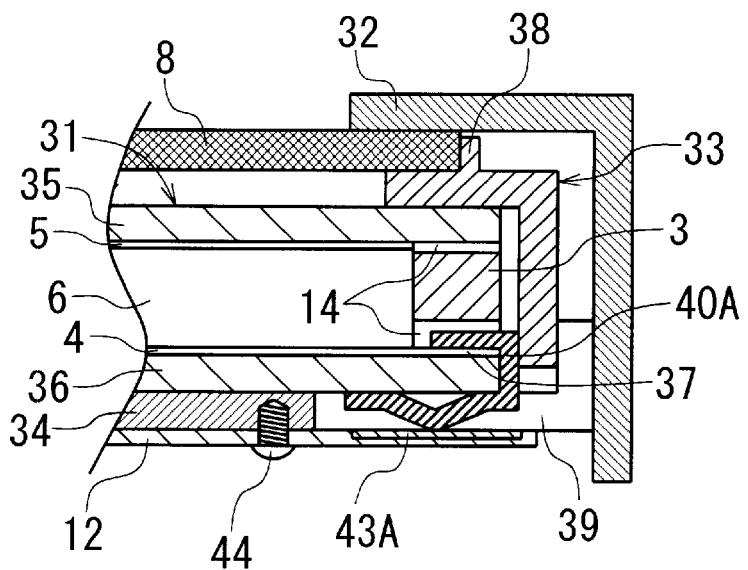
FIG. 9B is a partial, enlarged perspective view of a variation of the LCD device according to the fifth embodiment of FIG. 9A.

FIG. 9B shows a variation of the LCD device according to the fifth embodiment of FIG. 9A, in which the outer arm of a U-shaped electrode 40A is bent to have elasticity and the circuit board 12 has a flat terminal electrode 43A at its back surface. The terminal 43A is opposed to the outer arm of the electrode 43A.

When the board 12 is mounted on the rear chassi 34 and fixed thereto with a screw 44 in such a way that the terminal 43A is opposed to the outer arm of the U-shaped electrode 40, the bended top of the terminal 43 is contacted with the outer arm under pressure. Thus, secure electrical interconnection between the electrode 40A and the terminal 43A is realized.

With the variation of the fifth embodiment of FIG. 9B, there are the same additional advantages as those in the fifth embodiment of FIG. 9A.

Sixth Embodiment

Figure 10A:
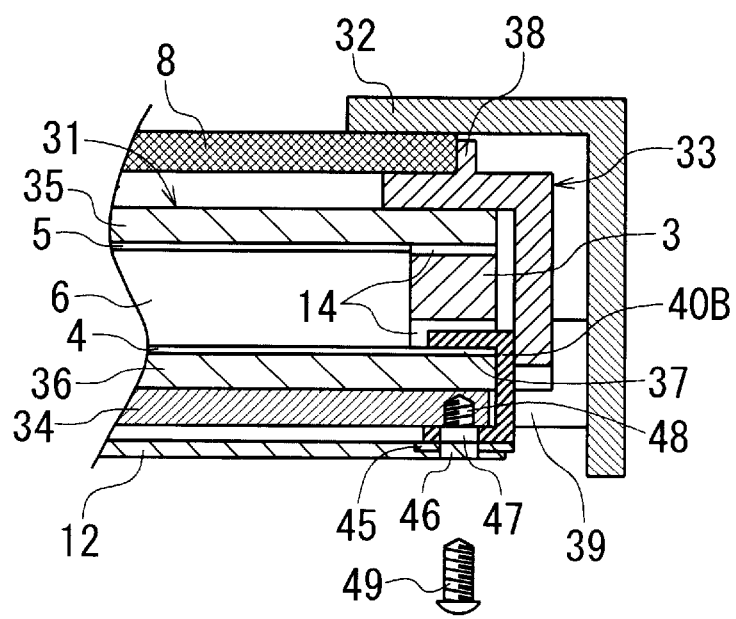
FIG. 10A is a partial, enlarged cross-sectional view of a LCD device according to a sixth embodiment of the invention.

FIG. 10A shows a LCD device according to a sixth embodiment of the invention, which has substantially the same configuration as the LCD device of the second embodiment of FIGS. 5, 6A and 6B except for the following difference.

The middle part of a U-shaped electrode 40B attached to the electrode-side plate 36 is extended to the surface of the rear chassi 34. The outer arm of the electrode 40B is located on the surface of the chassi 34. The circuit board 12 has an electrode terminal 45 on its back surface. The terminal 45 is overlapped with and mechanically contacted with the opposing outer arm of the electrode 40B for electrical interconnection without any cable.

Therefore, the detailed explanation is omitted here for simplification by attaching the same reference symbols as those used in the second embodiment in FIG. 10A.

To secure electrical interconnection, as shown in FIG. 10A, the board 12 has a hole 46 at the position of the terminal 45, the outer arm (i.e., the external terminal) of the U-shaped electrode 40B has a hole 47, the rear chassi 34 has a female screw 48, and a male screw 49 is inserted into the holes 46 and 47 to be engaged with the female screw 48.

When the board 12 is mounted on the rear chassi 34 and the male screw 49 is engaged with the female screw 48 at a specific screwing force in such a way that the terminal 45 is overlapped with the outer arm of the U-shaped electrode 40B, the board 12 is fixed to the chassi 34 and at the same time, the terminal 45 is contacted with the outer arm under pressure. Thus, secure electrical interconnection between the electrode 40B and the terminal 45 is realized.

With the LCD device of the sixth embodiment of FIG. 10A, as described above, the U-shaped electrode 40B is electrically connected to the circuit board 12 without any cable. Thus, there is an additional advantage that the fabrication cost of the LCD device can be lowered by the cost of cable and the workload for wiring cables is eliminated.

Moreover, there is another additional advantage that the electrode terminal 45 on the board 12 is automatically connected securely to the U-shaped electrode 40B through the operation of mounting the board 12 onto the rear chassi 34. This means that secure electrical interconnection can be completed through the simple mounting operation of board 12 without increasing the number of assembly operations.

Figure 10B:
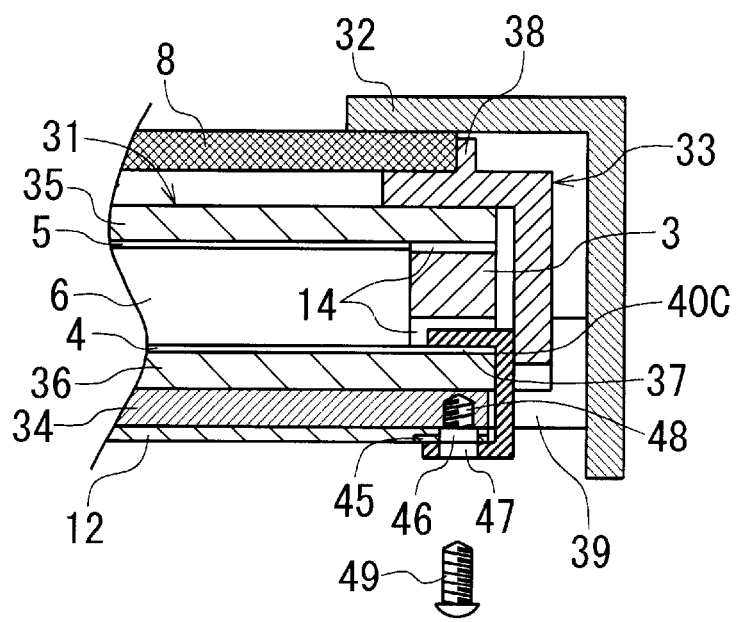
FIG. 10B is a partial, enlarged perspective view of a variation of the LCD device according to the sixth embodiment of FIG. 10A.

FIG. 10B shows a variation of the LCD device according to the sixth embodiment of FIG. 10A, in which the outer arm of a U-shaped electrode 40C is attached to the electrode-side plate 36 is extended to the surface of the circuit board 12. The outer arm of the electrode 40C is located on the surface of the board 12. The board 12 has an electrode terminal 45 on its surface. The terminal 45 is overlapped with and mechanically contacted with the opposing outer arm of the electrode 40C for electrical interconnection without any cable.

In the assembly operation of variation of FIG. 10B, first, the U-shaped electrode 40C is formed to be L-shaped. Then, the electrode 40C is attached to the plate 36 in such a way that the inner arm and the middle part the electrode 40C are extended along the inner surface and the side face of the plate 36, respectively. Thereafter, the circuit board 12 is mounted on the rear chassi 34 and then, the outer arm of the electrode 40C is bent inwardly to go along the surface of the board 12. Finally, the male screw 49 is inserted into the holes 46 and 47 and engaged with the female screw 48.

With the variation of the sixth embodiment of FIG. 10B, there are the same additional advantages as those in the sixth embodiment.

Seventh Embodiment

Figure 11A:
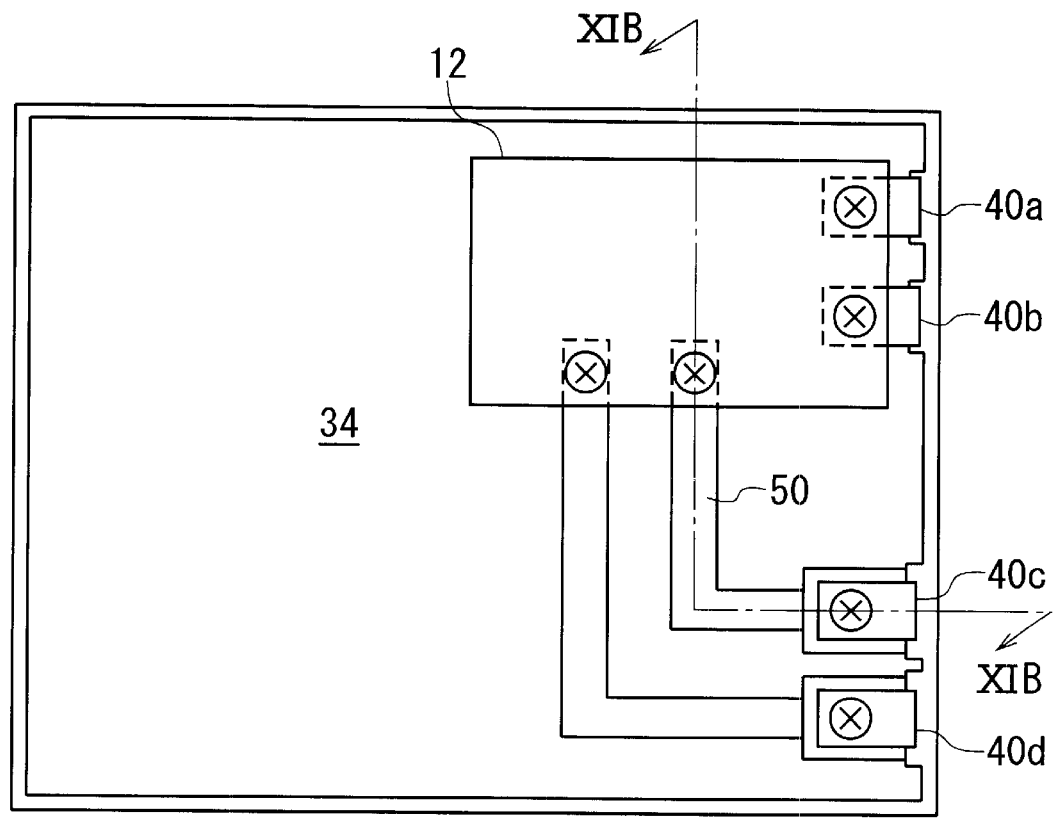
FIG. 11A is a bottom view of a LCD device according to a seventh embodiment of the invention.
Figure 11B:
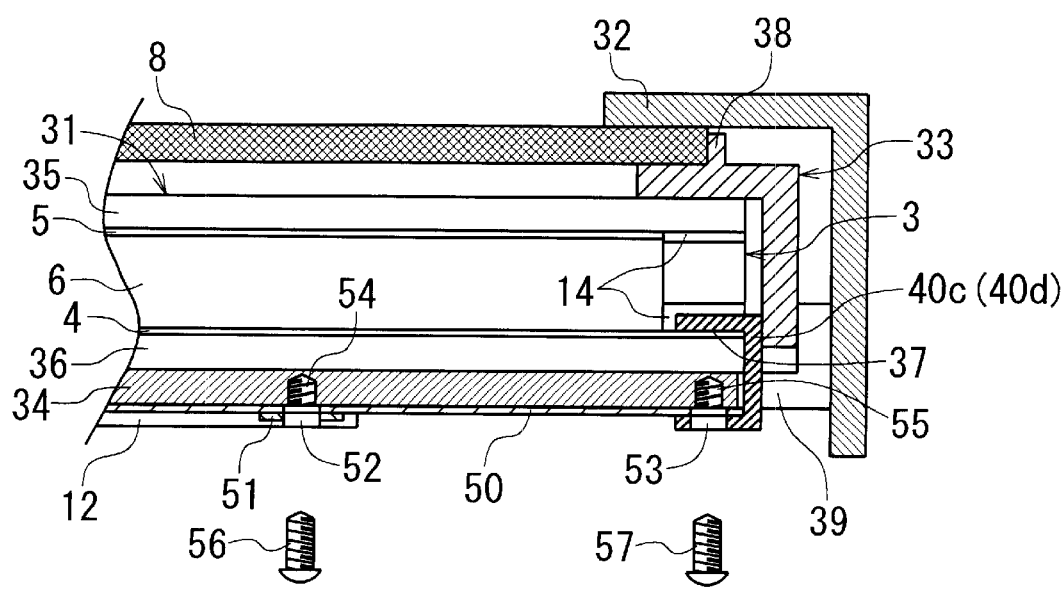
FIG. 11B is a partial, enlarged perspective view of the LCD device according to the seventh embodiment of FIG. 11A along the line XIB—XIB in FIG. 11A.

FIGS. 11A and 11B show a LCD device according to a seventh embodiment of the invention, which has substantially the same configuration as the LCD device of the second embodiment of FIGS. 5, 6A and 6B except for the following difference.

In the same way as the variation of the sixth embodiment of FIG. 10B, two U-shaped electrodes 40a and 40b serving as a pair of anode and cathode are fixed to the electrode-side plate 36 and the rear chassi 34. The circuit board 12 is fixed onto the chassi 34 by engaging two male screws with two female screws of the chassi 34 through holes of the board 12 and holes of the outer arm (external terminal) of the electrodes 40a and 40b. Thus, the board 12 is electrically connected to electrodes 40a and 40b.

Two U-shaped electrodes 40c and 40d serving as a pair of anode and cathode are fixed to the elecrode-side plate 36 and the rear chassi 34 apart from the electrodes 40a and 40b. Since the size of the board 12 is considerably smaller than the chassi 34, the electrodes 40c and 40d are far from the board 12. To electrically connect the electrodes 40c and 40d to the board 12, two wiring lines 50 are formed on the rear chassi 34 by a patterned conductive layer. The chassi 34 is made of dielectric synthetic resin for electrical insulation from the lines 50.

Referring to FIG. 11B, two electrode terminals 51 are formed on the back surface of the board 12. Two holes 52 are formed to penetrate the board 12 and the terminal 51. Two holes 53 are formed to penetrate the respective outer arms of the U-shaped electrodes 40c and 40d. Two female screws 54 and two female screws 55 are formed on the chassi 34 to be opposed to the holes 52 and 53, respectively. The wiring lines 50 are continuous from the vicinities of the screws 54 to the screws 55.

After the board 12 is mounted on the rear chassi 34, the male screws 56 are inserted into the corresponding holes 52 to engage with the corresponding female screws 54 and then, the screws 56 are tightened. Thus, the terminals 51 are contacted with the wiring lines 50 under pressure while fixing the boar 12 to the chassi 34. Moreover, the male screws 57 are inserted into the corresponding holes 53 to engage with the corresponding female screws 55 and then, the screws 57 are tightened. Thus, the electrodes 40c and 40d are contacted with the corresponding wiring lines 50 under pressure. As a result, electrical interconnection between the electrodes 40c and 40d and the board 12 is realized by way of the wiring lines 50.

With the LCD device of the seventh embodiment of FIGS. 11A and 11B, as described above, not only the U-shaped electrodes 40a and 40b but also the U-shaped electrodes 40c and 40d are electrically connected to the circuit board 12 without any cable. Thus, there is an additional advantage that the fabrication cost of the LCD device can be lowered by the cost of cable and the workload for wiring cables is eliminated.

Moreover, there is another additional advantage that the electrode terminals 51 on the board 12 are automatically connected securely to the electrodes 40c and 40d through the operation of mounting the board 12 onto the rear chassi 34 and the operation of fixing the outer arms of the electrodes 40c and 40d to the chassi 34.

The electrical connection between the electrodes 40c and 40d and the board 12 is realized by way of the lines 50. Therefore, there is a further additional advantage that electrical interconnection of the board 12 with the electrodes 40c and 40d can be achieved even if the board 12 is far from the electrodes 40c and 40d due to the positional constraint or the like.

Eighth Embodiment

Figure 12A:
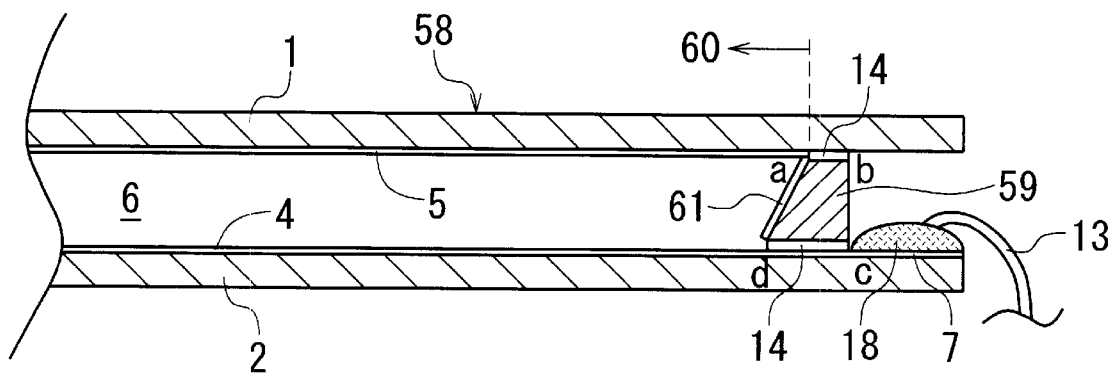
FIG. 12A is a partial cross-sectional view of a flat-type fluorescent lamp according to an eighth embodiment of the invention.
Figure 12B:
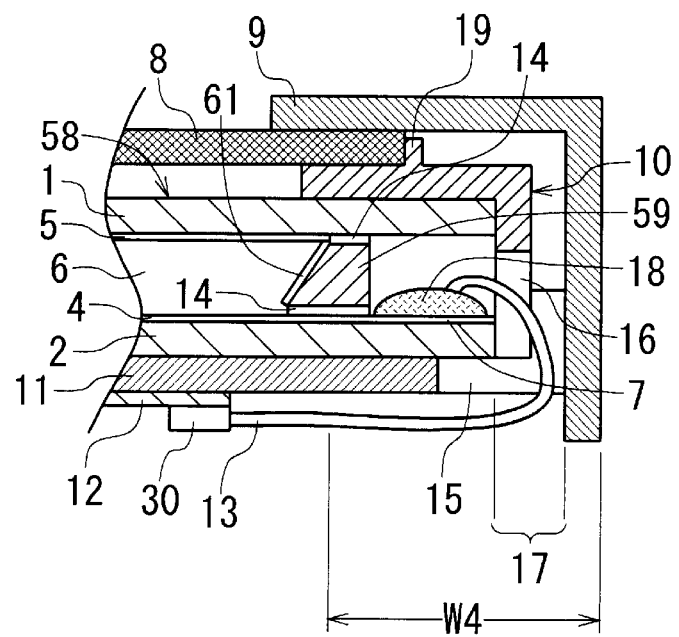
FIG. 12B is a partial, enlarged perspective view of a LCD device according to the eighth embodiment.

FIG. 12A shows a flat-type fluorescent lamp 58 according to an eighth embodiment of the invention and FIG. 12B shows a LCD device according to the eighth embodiment using the lamp 58. In this embodiment, the frame member has the following contrived shape to narrow the picture-frame area and widen the emission area of the lamp 58.

As shown in FIG. 12A, the lamp 58 of the eighth embodiment comprises a container formed by a rectangular emission-side plate 1, a rectangular electrode-side plate 2, and a rectangular frame member 59 that intervenes between the plates 1 and 2. The plates 1 and 2 are coupled to each other by way of the member 59 with the frit glass 14. The plates 1 and 2 are entirely overlapped with each other by way of the member 59 in such a way that the contour of the plate 1 accords with that of the plate 2. The rectangular outer edges (peripheral areas) of the plates 1 and 2 are placed outside the member 59. Electrodes 4 are formed on the inner surface of the plate 2 by a screen printing method or the like. The end parts of part of the electrodes 4 are extended to the outside of the member 59 on the inner surface of the plate 2, forming four electrode terminals 7 (i.e., two anode terminals and two cathode terminals). Cables 13 are bonded to the respective terminals 7 with solders 18.

A fluorescent material layer 5 is formed on the inner surface of the emission-side plate 1 of the lamp 58. A gaseous substance 6 (e.g., an inert gas) is confined into the container at an appropriate pressure.

The frame member 59 has a trapezoidal cross section, as clearly shown in FIG. 12B. Here, supposing that the trapezoid abcd of the cross section of the member 59 has the upper side ab on the emission side and the lower side cd on the electrode side, the lower side cd is longer than the upper side ab. The inner edge a of the member cd on the emission side is shifted outwardly (i.e., shifted toward the right side in FIG. 12A) with respect to the inner edge d thereof on the electrode side. The angle abc and the angle bcd are right. The angle adc is acute and the angle bad are obtuse.

A fluorescent layer 61 is formed on the inner side face of the member 59. Instead of the layer 61, a reflection layer may be formed on the same side face. The fluorescent material layer 5 is coated on the inner surface of the plate 1 in such a way as to reach the member 59.

One end of the cable 13 is connected to the exposed terminal 7 with the solder 18 while the other end thereof is connected to the circuit board 12 by way of the connector 30. The cable 13 is taken out through the cable window 17 formed by the opening 16 of the center chassi 10 and the opening 15 of the rear chassi 11.

With the fluorescent lamp 58 of the seventh embodiment of FIG. 12A, as described above, the cross section of the frame member 59 is formed to be trapezoidal and at the same time, the fluorescent layer 61 (or, the reflection layer) is formed on the oblique inner side face of the member 59. Therefore, there is an advantage that the emission area 60 can be expanded to the emission-side inner edge a of the member 59 compared with the prior-art fluorescent lamp 120 shown in FIGS. 2A and 2B.

Next, the LCD device according to the eighth embodiment is explained below.

As shown in FIG. 12B, the LCD device of the eight embodiment is equipped with the lamp 58 of FIG. 12A. The configuration of the LCD device is approximately the same as the prior-art LCD device shown in FIG. 2B except for the frame member 59.

Specifically, the LCD device of FIG. 12B comprises the LCD panel 8, the flat-type fluorescent lamp 58 as the backlight, the rectangular front chassi 9, the rectangular center chassi 110, and the rectangular rear chassi 111. The panel 8 is located on the emission side of the lamp 58. The peripheral area of the panel 8 is sandwiched by the front and center chassis 9 and 10. The chassis 9, 10 and 11 are fixed together to enclose the panel 8 and the lamp 58. The circuit board 12 is mounted on the opposite surface of the rear chassi 11 to the lamp 58 (i.e., the rear surface of the LCD device). The board 12 includes an inverter circuit and other necessary circuits.

Variations of the LCD device of the eight embodiment of FIG. 12A are easily created by replacing the lamp 21 or 31 used in the above-described first to seventh embodiments with the lamp 58 of the eighth embodiment. In any of these variations of the LCD device, there is the same advantage that the emission area is expanded and the picture-frame area is narrowed.

Typical dimensions of the parts of the LCD device of the eighth embodiment are as follows:

Preferably, for example, in the trapezoid abcd of the cross section of the member 59, the upper side ab is set at 2 mm and the lower side cd is set at 4 mm. In this case, the width W4 (i.e., the length between the emission-side inner edge a of the member 59 to the outer side face of the front chassi 9) of the picture-frame area is decreased approximately 10 mm. On the other hand, the width W1 of the prior-art LCD device is approximately 12 mm. Thus, the emission area 60 of the lamp 58 of the eighth embodiment is expanded by approximately 2 mm compared with the prior-art lamp 120. This means that the picture-frame area of the LCD device is narrowed and the display are thereof is expanded by the same value.

Ninth Embodiment

Figure 13A:
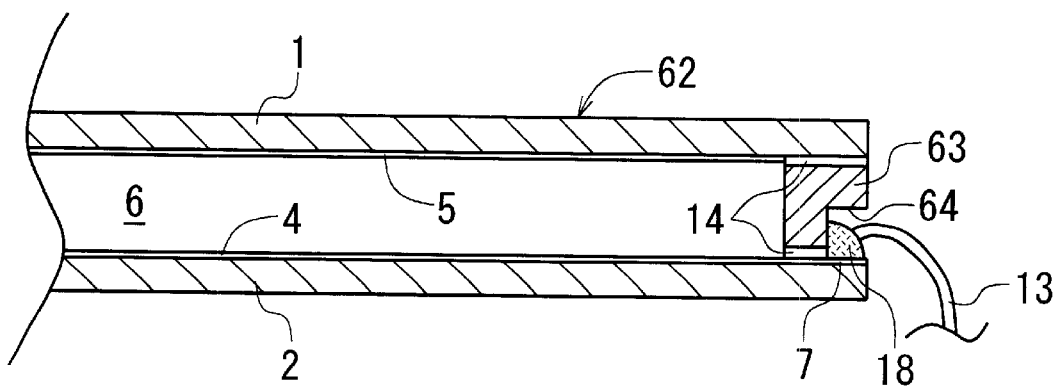
FIG. 13A is a partial cross-sectional view of a flat-type fluorescent lamp according to a ninth embodiment of the invention.
Figure 13B:
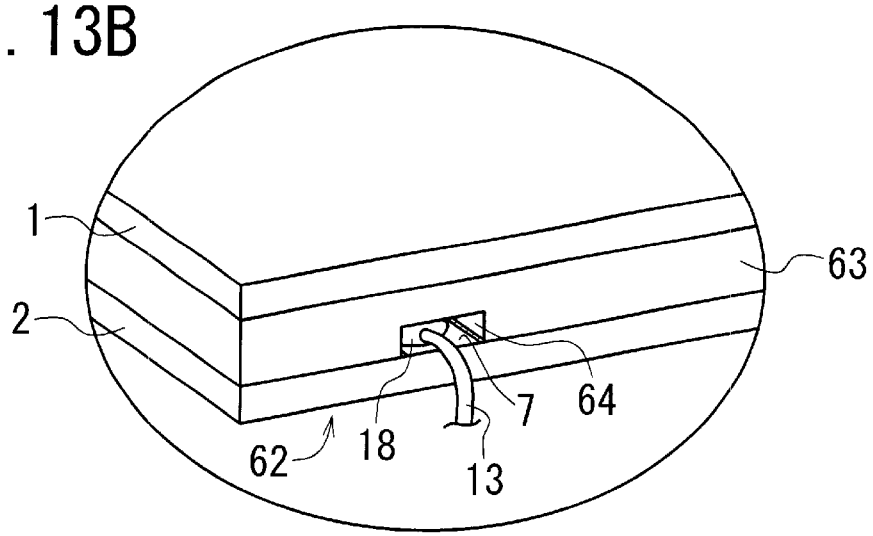
FIG. 13B is a partial, enlarged perspective view of the lamp according to the ninth embodiment of FIG. 13A.
Figure 13C:
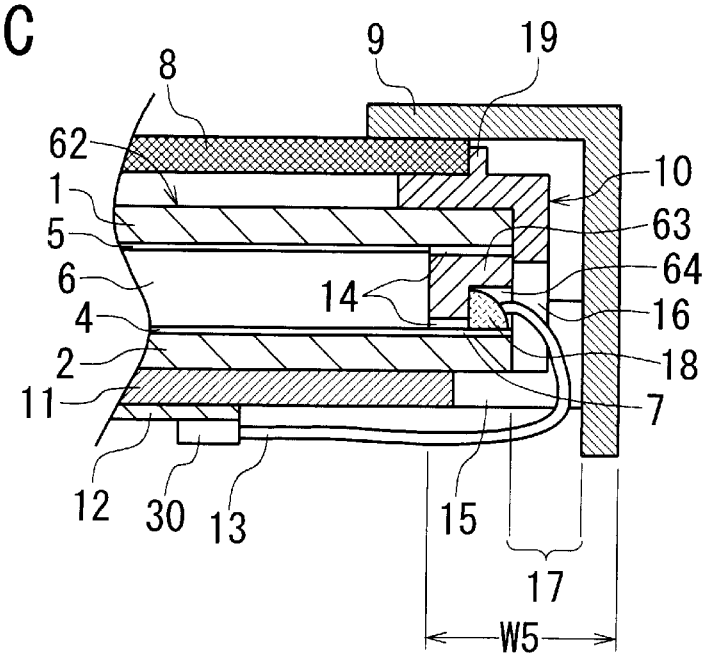
FIG. 13C is a partial, enlarged cross-sectional view of a LCD device according to the ninth embodiment.

FIGS. 13A and 13B show a flat-type fluorescent lamp 62 according to a ninth embodiment of the invention and FIG. 13C shows a LCD device according to the ninth embodiment using the lamp 62. In this embodiment, the frame member has the following contrived shape to narrow the picture-frame area and widen the emission area of the lamp 58.

As shown in FIG. 13A, the lamp 62 of the ninth embodiment comprises a container formed by a rectangular emission-side plate 1, a rectangular electrode-side plate 2, and a rectangular frame member 63 coupled together with the frit glass 14. The plates 1 and 2 are entirely overlapped with each other in such a way that th rectangular outer edges of the plates 1 and 2 accord with the outer edge of the member 63. Electrodes 4 are formed on the inner surface of the plate 2. A fluorescent material layer 5 is formed on the inner surface of the plate 1. A gaseous substance 6 is confined into the container at an appropriate pressure. The emission surface is located on the plate 1.

As shown in FIGS. 13A and 13B, a recess 64 with a rectangular cross section is formed in the frame member 63. The recess 64 is used for exposing the terminal 7 formed on the inner surface of the plate 2 to the outside of the container. The recess 64 is extended inwardly from the outer edge of the member 63 at a specific depth less than the total width of the member 63. The contours of the plates 1 and 2 are in accordance with the outer edge of the member 63, which means that the plates 1 and 2 do not protrude outwardly from the member 63.

One end of a cable 13 is connected to the exposed terminal 7 with a solder 18 in the recess 64 while the other end thereof is connected to the circuit board 12 by way of the connector 30. The cable 13 is taken out through the cable window 17 formed by the opening 16 of the center chassi 10 and the opening 15 of the rear chassi 11.

With the fluorescent lamp 62 of the ninth embodiment of FIGS. 13A and 13B, as described above, even if the peripheral area of the plate 2 does not protrude from the frame member 63, the terminal 7 is exposed outwardly from the member 63 due to the recess 64. Thus, the terminal 7 can be electrically connected to the cable 13 in the recess 64. Accordingly, there is an advantage that the emission area of the lamp 62 is expanded compared with the prior-art fluorescent lamp 120 shown in FIGS. 2A and 2B.

Next, the LCD device according to the ninth embodiment is explained below.

As shown in FIG. 13C, the LCD device of the ninth embodiment is equipped with the lamp 62 of FIGS. 13A and 13B. The configuration of the LCD device is substantially the same as the LCD device shown in FIG. 12B of the eighth embodiment except that the frame member 63 is used instead of the frame member 59 and that the peripheral areas of the plates 1 and 2 do not protruded from the member 63.

Variations of the LCD device of the ninth embodiment of FIG. 13C are easily created by replacing the lamp 21 or 31 used in the above-described first to seventh embodiments with the lamp 62 of the ninth embodiment. In any of these variations of the LCD device, there is the same advantage that the emission area is expanded and the picture-frame area is narrowed.

Typical dimensions of the parts of the LCD device of the ninth embodiment are as follows:

For example, the lateral length of the frame member 63 in FIG. 13C is set at 4 mm and the lateral length of the recess 64 is set at 2 mm. In this case, the width W5 (i.e., the length between the inner edge of the member 63 to the outer side face of the front chassi 9) of the picture-frame area is decreased to approximately 7 mm. On the other hand, the width W1 of the prior-art LCD device is approximately 12 mm. Thus, the emission area of the lamp 62 of the ninth embodiment is expanded by approximately 5 mm compared with the prior-art lamp 120. This means that the picture-frame area of the LCD device is narrowed and the display are thereof is expanded by the same value.

Tenth Embodiment

Figure 14:
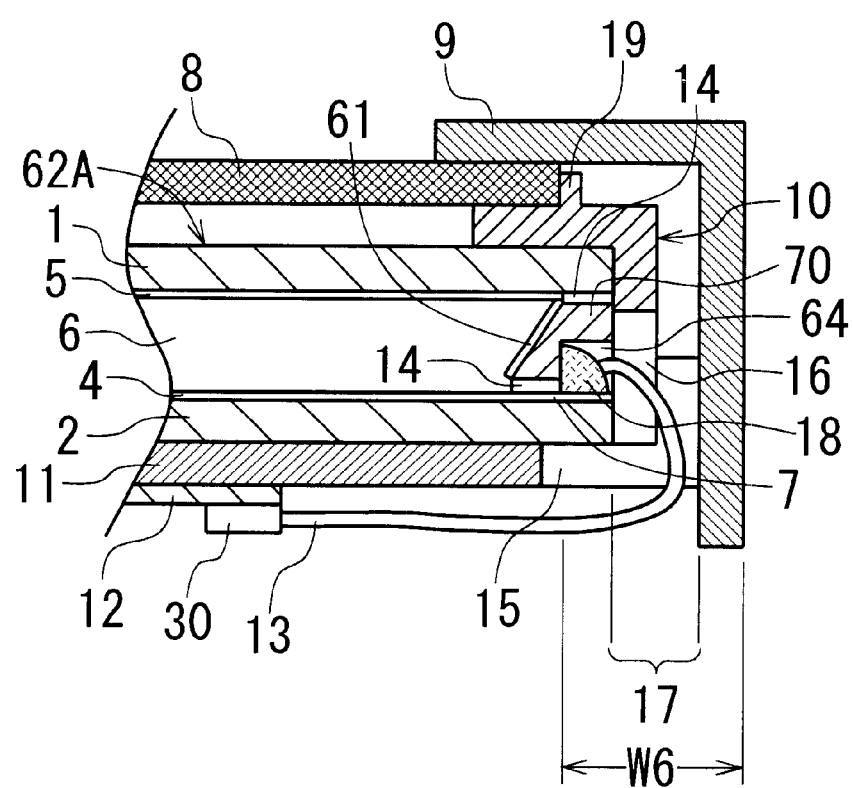
FIG. 14 is a partial, enlarged cross-sectional view of a LCD device according to a tenth embodiment of the invention.

FIG. 14 shows a LCD device according to a tenth embodiment of the invention using a flat-type fluorescent lamp 62A, which corresponds to the combination of the feature of the eighth embodiment of FIG. 12A and that of the ninth embodiment of FIGS. 13A and 13B. The lamp 62A includes a frame member 70.

Typical dimensions of the parts of the LCD device of the tenth embodiment are as follows:

For example, the width W6 (i.e., the length between the emission-side inner edge of the member 70 to the outer side face of the front chassi 9) of the picture-frame area is decreased approximately 5 mm. On the other hand, the width W1 of the prior-art LCD device is approximately 12 mm. Thus, the emission area of the lamp 62A of the tenth embodiment is expanded by approximately 7 mm compared with the prior-art lamp 120. This means that the picture-frame area of the LCD device is narrowed and the display are thereof is expanded by the same value.

Eleventh Embodiment

Figure 15A:
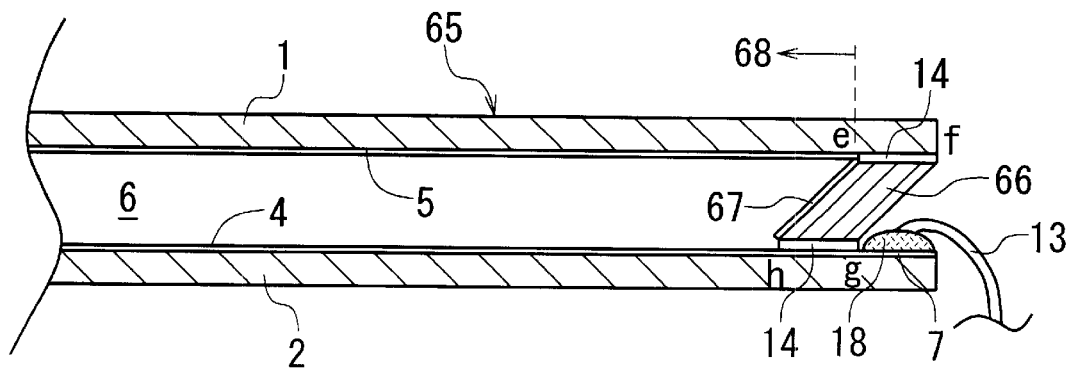
FIG. 15A is a partial cross-sectional view of a flat-type fluorescent lamp according to an eleventh embodiment of the invention.
Figure 15B:
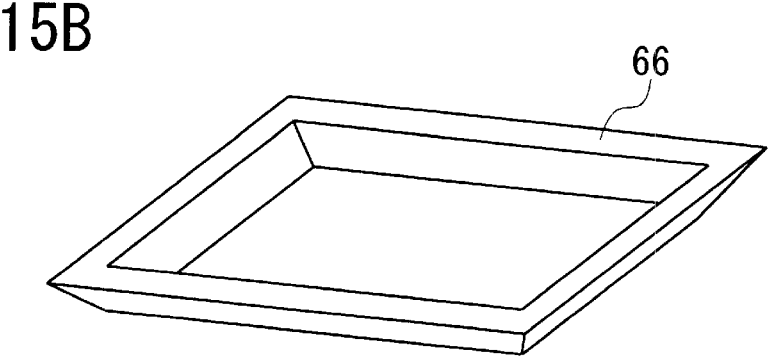
FIG. 15B is a perspective view of the frame member of the lamp according to the eleventh embodiment of FIG. 15A.
Figure 15C:
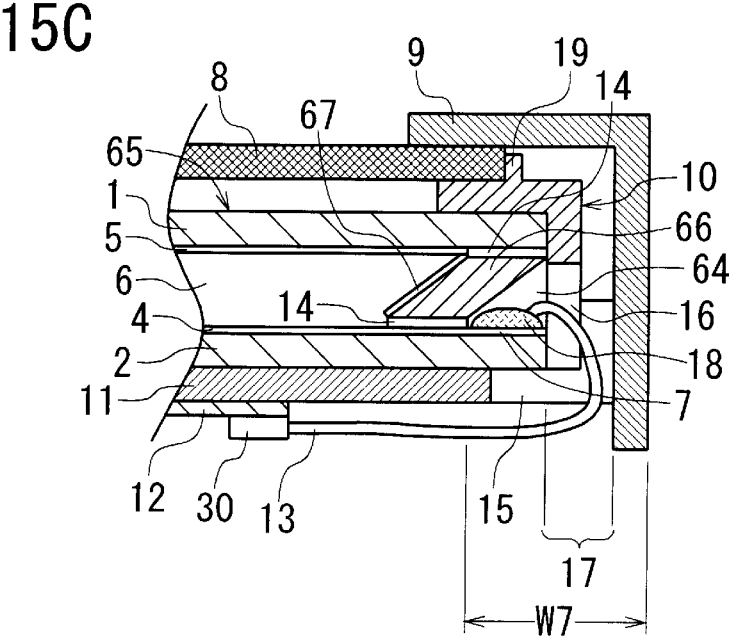
FIG. 15C is a partial, enlarged cross-sectional view of a LCD device according to the eleventh embodiment.

FIG. 15A shows a flat-type fluorescent lamp 65 according to an eleventh embodiment of the invention, FIG. 15B shows the frame member 66 used therein, and FIG. 15C shows a LCD device according to the eleventh embodiment using the lamp 65. In this embodiment, the frame member has the following contrived shape to narrow the picture-frame area and widen the emission area of the lamp 65.

As shown in FIG. 15A, the lamp 65 of the eleventh embodiment comprises a container formed by a rectangular emission-side plate 1, a rectangular electrode-side plate 2, and a rectangular frame member 66, a gaseous substance 6 confined in the container, a fluorescent material layer 5 formed on the inner surface of the plate 1, and electrodes 4 formed on the inner surface of the plate 2. The plate 1 has the emission surface.

The frame member 66 has a cross section of parallelogram, as clearly shown in FIG. 15A. Here, the parallelogram efgh of the cross section of the member 66 has the lower side gh on the electrode side and the inner side eh on the inside. The angle formed by the lower side gh and the inner side eh is acute. Thus, the member 66 has the whole shape as shown in FIG. 15B. Specifically, the four inner surfaces of the member 66 are continuous along the four sides of the rectangular while the four outer surfaces thereof are continuous along the same four sides thereof. The four inner surfaces and the four outer surfaces of the member 66 are all oblique.

As shown in FIG. 15A, the inner edge e of the member 66 on the emission side is shifted outwardly (shifted toward the right side in FIG. 15A) with respect to the inner edge h thereof on the electrode side. Therefore, the nearer to the emission surface, the wider the discharge space. Also, the outer edge g of the member 66 on the emission side is shifted inwardly (shifted toward the left side in FIG. 15A) with respect to the outer edge f thereof on the electrode side.

The plates 1 and 2 are entirely overlapped with each other in such a way that their contours accord with each other. The edge of the emission-side plate 1 is in accordance with the outer edge f of the member 66. The edge of the electrode-side plate 2 is laterally shifted outwardly from the outer edge g of the member 66. The terminal 7 of the electrodes 4 is located on the inner side of the plate 2 outside the container. One end of the cable 13 is connected to the terminal 7 with the solder 18.

A fluorescent material layer 67 is formed on the oblique inner face of the member 66. Instead of the layer 67, a reflection layer may be formed on the same face. The fluorescent material layer 5 is coated on the inner surface of the plate 1 in such a way as to reach the member 66.

With the fluorescent lamp 65 of the eleventh embodiment of FIG. 15A, as described above, the cross section of the frame member 66 is formed to be of parallelogram and at the same time, the fluorescent layer 67 (or, the reflection layer) is formed on the oblique inner side face of the member 66. As a result, the emission area 68 can be expanded to the emission-side inner edge e of the member 66 compared with the prior-art fluorescent lamp 120 shown in FIGS. 2A and 2B.

Accordingly, there is an advantage that a favorable space for exposing the terminal 7 of the electrodes 4 from the container is formed on the inner space of the plate 2 while expanding the emission area 58 and narrowing the picture-frame area.

There is another advantage that the member 66 is processed more easily than the frame member 63 according to the ninth embodiment of FIGS. 13A and 13B, because the member 66 has a cross section of parallelogram.

Next, the LCD device according to the eleventh embodiment is explained below.

As shown in FIG. 15C, the LCD device of the eleventh embodiment is equipped with the lamp 65 of FIG. 15A. The configuration of the LCD device is approximately the same as the prior-art LCD device shown in FIG. 2B except for the frame member 59.

Variations of the LCD device of the eleventh embodiment of FIG. 15A are easily created by replacing the lamp 21 or 31 used in the above-described first to seventh embodiments with the lamp 65 of the eleventh embodiment. In any of these variations of the LCD device, there is the same advantage that the emission area is expanded and the picture-frame area is narrowed.

Typical dimensions of the parts of the LCD device of the eleventh embodiment are as follows:

For example, in the parallelogram efgh of the cross section of the member 66, the upper and lower sides ef and gh are set at 4 mm and the angle ehg is set at 45°. In this case, the width W7 (i.e., the length between the emission-side inner edge e of the member 66 to the outer side face of the front chassi 9) of the picture-frame area is decreased approximately 7 mm. On the other hand, the width W1 of the prior-art LCD device is approximately 12 mm. Thus, the emission area 68 of the lamp 65 of the eleventh embodiment is expanded by approximately 5 mm compared with the prior-art lamp 120. This means that the picture-frame area of the LCD device is narrowed and the display are thereof is expanded by the same value.

VARIATIONS

Needless to say, the invention is not limited to the above-described embodiments. Any change or modification may be added to these embodiments within the spirit of the invention.

While the preferred forms of the present invention has been described, it is to be understood that modifications will be apparent to those skilled in the art without departing from the spirit of the invention. The scope of the present invention, therefore, is to be determined solely by the following claims.

What is claimed is:

1. A flat-type fluorescent lamp comprising:
   (a) a container having a first plate, a second plate, and a frame member;
      the first and second plates being opposed to each other and fixed together with the frame member in such a way as to have a specific distance between the first and second plates;
      the first plate forming a flat emission surface;
   (b) a gaseous substance confined in the container;
   (c) a fluorescent material layer formed on an inner surface of the container;
   (d) electrodes formed on an inner surface of the second plate; and
   (e) a conductor member attached to the second plate in such a way as to extend along the inner surface of the second plate and an outer edge face thereof;
      a first end of the conductor member being contacted with a terminal part of the electrodes;
      a second end of the conductor member being located outside the second plate.

2. The lamp according to claim 1, wherein the conductor member is U-shaped in cross section, and the second end of the conductor member is extended inwardly along an outer surface of the second plate.

3. The lamp according to claim 1, wherein the first end of the conductor member is sandwiched by the second plate and the frame member.

4. The lamp according to claim 1, wherein a depression or recess is formed at a location of the second plate or the frame member near the conductor member.

5. The lamp according to claim 1, further comprising a circuit board having an electrode terminal provided on a side of an outer surface of the second plate;
   wherein the electrode terminal of the circuit board is contacted with the second end of the conductor member.

6. The lamp according to claim 1, wherein one of the electrode terminal and the conductor member has a part with spring function;
   and wherein the part with spring function is contactable with the other of the electrode terminal and the conductor member.

7. The lamp according to claim 1, further comprising a chassi covering an outer surface of the second plate, and a circuit board having an electrode terminal and mounted on the chassi;
   wherein the circuit board and the conductor member are fixed with a screw at the electrode terminal.

8. The lamp according to claim 1, further comprising a resin chassi covering an outer surface of the second plate, a circuit board having an electrode terminal and mounted on the chassi, and a circuit pattern placed on the chassi;
   wherein the chassi includes first and second female screws located apart from each other;
   and wherein the circuit pattern extends from the first female screw to the second female screw;
   and wherein the electrode terminal of the chassi and the conductor member are overlapped and fixed by engaging a first male screw with the first female screw;
   and wherein the second end of the conductor member and the chassi are overlapped and fixed by engaging a second male screw with the second female screw.

9. The lamp according to claim 1, wherein an outer face of the frame member, an outer side face of the first plate, and an outer side face of the second plate form an approximately flat sidewall of the lamp.

10. The lamp according to claim 9, wherein the sidewall of the lamp is approximately perpendicular to the emission surface.

11. A flat-type fluorescent lamp comprising:
(a) a container having a first plate, a second plate, and a frame member;
the first and second plates being opposed to each other and fixed together with the frame member in such a way as to have a specific distance between the first and second plates;
the first plate forming a flat emission surface;
(b) a gaseous substance confined in the container;
(c) a fluorescent material layer formed on an inner surface of the container; and
(d) electrodes for applying a voltage to the gaseous substance;
wherein an inner edge of the frame member on a side of the first plate is shifted outwardly from an inner edge of the frame member on a side of the second plate.

12. The lamp according to claim 9, wherein the frame member has a trapezoidal cross section.

13. The lamp according to claim 9, wherein an outer face of the frame member, an outer side face of the first plate, and an outer side face of the second plate form an approximately flat sidewall of the lamp.

14. The lamp according to claim 13, wherein the sidewall of the lamp is approximately perpendicular to the emission surface.

15. A flat-type fluorescent lamp is provided, which comprises:
(a) a container having a first plate, a second plate, and a frame member;
the first and second plates being opposed to each other and fixed together with the frame member in such a way as to have a specific distance between the first and second plates;
the first plate forming a flat emission surface;
(b) a gaseous substance confined in the container;
(c) a fluorescent material layer formed on an inner surface of the container; and
(d) electrodes formed on an inner surface of the second plate;
the electrodes having a terminal part;
wherein the frame member has a recess for exposing the terminal part from the frame member outwardly;
and wherein the recess is located in a peripheral area of the frame member.

16. The lamp according to claim 15, wherein an outer face of the frame member, an outer side face of the first plate, and an outer side face of the second plate form an approximately flat sidewall of the lamp.

17. The lamp according to claim 16, wherein the sidewall of the lamp is approximately perpendicular to the emission surface.

18. A flat-type fluorescent lamp comprising:
(a) a container having a first plate, a second plate, and a frame member;
the first and second plates being opposed to each other and fixed together with the frame member in such a way as to have a specific distance between the first and second plates;
the first plate forming a flat emission surface;
(b) a gaseous substance confined in the container;
(c) a fluorescent material layer formed on an inner surface of the container; and
(d) electrodes formed on an inner surface of the second plate;
wherein an inner edge of the frame member on a side of the first plate is shifted outwardly from an inner edge of the frame member on a side of the second plate;
and wherein an outer edge of the frame member on the side of the second plate is shifted inwardly from an outer edge of the frame member on the side of the first plate.

19. The lamp according to claim 18, wherein the frame member has a parallelogrammatic cross section;
and wherein the inner face of the frame member and the second plate are at an acute angle.

20. The lamp according to claim 18, further comprising an additional fluorescent material layer or a reflection layer formed on the inner face of the frame member.

21. The lamp according to claim 20, wherein the fluorescent material of the fluorescent material layer in the container is formed to contact the frame member.

22. An illumination unit comprising one of the flat-type fluorescent lamps according to claim 1.

23. A liquid crystal display device comprising one of the flat-type fluorescent lamps according to claim 1.

* * * * *